(12) United States Patent
Jia et al.

(10) Patent No.: US 12,532,094 B2
(45) Date of Patent: Jan. 20, 2026

(54) WAVELENGTH SELECTIVE SWITCHING APPARATUS AND RELATED METHOD

(71) Applicant: HUAWEI TECHNOLOGIES CO., LTD., Guangdong (CN)

(72) Inventors: Wei Jia, Shenzhen (CN); Yunfei Wu, Dongguan (CN); Yuhua Duan, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 340 days.

(21) Appl. No.: 18/239,482

(22) Filed: Aug. 29, 2023

(65) Prior Publication Data

US 2023/0403484 A1    Dec. 14, 2023

Related U.S. Application Data

(63) Continuation of application No. PCT/CN2021/136893, filed on Dec. 9, 2021.

(30) Foreign Application Priority Data

Mar. 15, 2021  (CN) .......................... 202110278011.6

(51) Int. Cl.
*H04Q 11/00* (2006.01)
*H04J 14/02* (2006.01)

(52) U.S. Cl.
CPC ...... *H04Q 11/0005* (2013.01); *H04J 14/0212* (2013.01); *H04Q 2011/0009* (2013.01)

(58) Field of Classification Search
CPC ......... H04Q 11/0005; H04Q 2011/0009; H04J 14/0212; G02B 6/29395; G02B 6/356; G02B 6/3512; G02B 26/0808
See application file for complete search history.

(56) References Cited

U.S. PATENT DOCUMENTS

2018/0288504 A1 * 10/2018 Yang .................. H04Q 11/0005

FOREIGN PATENT DOCUMENTS

WO    WO-2017091884 A1 *  6/2017 .......... H04J 14/0215
WO    WO-2018191862 A1 * 10/2018 ............... G02B 6/35
(Continued)

OTHER PUBLICATIONS

WO_2018191862_A1 (English translation) (Year: 2018).*
(Continued)

*Primary Examiner* — Thomas A Hollweg
*Assistant Examiner* — Mary A El-Shammaa
(74) *Attorney, Agent, or Firm* — Fish & Richardson P.C.

(57) ABSTRACT

The present disclosure relates to a wavelength selective switching apparatus and a related method thereof. The apparatus includes: at least one input port and a plurality of output ports; a dispersion assembly, configured to respectively disperse a received first-band optical signal and a received second-band optical signal into a plurality of first optical sub-signals and a plurality of second optical sub-signals in a dispersion plane; a first-band filter, configured to reflect the plurality of first optical sub-signals and transmit the plurality of second optical sub-signals; and a light redirection device, configured to make each of a plurality of sub-band optical signals to be emitted toward the first-band filter in a redirected manner. In a port plane, a plurality of optical sub-signals are respectively incident to the first-band filter at an incidence angle within a first predetermined angle range in a backward propagation direction.

20 Claims, 11 Drawing Sheets

(56) References Cited

FOREIGN PATENT DOCUMENTS

| WO | WO-2019243809 A1 | * | 12/2019 | ......... H04Q 11/0001 |
| WO | WO-2021164406 A1 | * | 8/2021 | ............ G02B 6/356 |
| WO | WO-2022193747 A1 | * | 9/2022 | ........... H04B 10/572 |

OTHER PUBLICATIONS

WO_2021164406_A1 (English translation) (Year: 2021).*
WO_2022193747_A1 (English translation) (Year: 2022).*
Kazunori et al., "Wide-Passband C+L-band Wavelength Selective Switch by Alternating Wave-Band Arrangement on LCOS," Proceeding of 2018 European Conference on Optical Communication(ECOC), Sep. 23, 2018, pp. 1-3.
Extended European Search Report in European Appln No. 21931321. 0, dated Jul. 10, 2024, 6 pages.

* cited by examiner

WAVELENGTH SELECTIVE SWITCHING APPARATUS AND RELATED METHOD

CROSS-REFERENCE TO RELATED APPLICATIONS

This application is a continuation of International Application No. PCT/CN2021/136893, filed on Dec. 9, 2021, which claims priority to Chinese Patent Application No. 202110278011.6, filed on Mar. 15, 2021. The disclosures of the aforementioned applications are hereby incorporated by reference in their entireties.

TECHNICAL FIELD

Embodiments of the present disclosure relate to the field of optical communication, and more specifically, to a wavelength switching apparatus for processing a multi-band optical signal and a related method.

BACKGROUND

With rapid development of optical network services and increase of a switching capacity, a range of a signal band that needs to be processed by a ROADM node of an optical switching unit also increases, and gradually expands from a C band to C+L bands. Usually, a range of the C band is 1524 nm to 1572 nm, and a range of an L band is 1575 nm to 1623 nm. A wavelength selective switching apparatus (WSS) based on an optical switch array such as an LC array chip, an LCOS chip, or a MEMS chip is an important component of the ROADM node. Compared with a current C-band WSS, a C+L-band WSS needs to process a wider spectrum. When an optical switch array of a same size, a same light spot, and an existing C-band WSS optical design architecture are used, a filtering steepness or a filtering bandwidth of the C+L-band WSS is sharply reduced. Therefore, it is necessary to study a new optical design scheme to improve the filtering steepness or filtering bandwidth of the C+L-band WSS.

SUMMARY

An objective of the present disclosure is to propose an improved wavelength selective switching apparatus and a related method thereof. This can at least alleviate or reduce a technical problem of a large overall size of the wavelength selective switching apparatus and/or a filter impairment during signal switching in a port direction.

A first aspect of the present disclosure provides a wavelength selective switching apparatus. The apparatus includes: at least one input port and a plurality of output ports, where the at least one input port is configured to input a first-band optical signal and a second-band optical signal, and each output port is configured to output an optical signal within a predetermined band range; a dispersion assembly, configured to respectively disperse the first-band optical signal and the second-band optical signal that are received from the input port into a plurality of first optical sub-signals and a plurality of second optical sub-signals in a dispersion plane, where the plurality of first optical sub-signals respectively correspond to a plurality of first sub-bands in a first band, the plurality of second optical sub-signals respectively correspond to a plurality of second sub-bands in a second band, and the dispersion plane is defined as a plane in which a light propagation direction and a dispersion direction are located; a first-band filter, configured to reflect the plurality of first optical sub-signals and transmit the plurality of second optical sub-signals; and a light redirection device, configured to: receive the plurality of first optical sub-signals and the plurality of second optical sub-signals in a forward propagation direction from the first-band filter, and make, in a port plane in which a predetermined arrangement direction of the plurality of output ports and the light propagation direction are located, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, where the forward propagation direction is defined as an optical propagation direction from the input port to the light redirection device, and the backward propagation direction is defined as an optical propagation direction from the light redirection device to the output port; and both the first backward incidence angle and the second backward incidence angle are within a first predetermined angle range.

It will be understood that according to the wavelength selective switching apparatus of the present disclosure, a range of a first predetermined angle of incidence to the first-band filter can be designed to greatly reduce a filter spectrum shift of the first-band filter during signal switching in a port direction, thereby alleviating a filter impairment of a signal. In addition, according to a design of the present disclosure, a plurality of bands may share a plurality of optical components, so that a size of a WSS module is increased as little as possible, and a specially customized waveguide component does not need to be added.

In particular, in some embodiments, the first predetermined angle range is a range of 0±20 degrees, 0±10 degrees, 0±5 degrees, or 0±3 degrees. It is understood that with such an angle range, a beam may be made to be incident (incident for a second time) to the first-band filter at a small angle in a backward propagation direction in the port plane. This can greatly reduce the filter spectrum shift of the first-band filter during signal switching in the port direction, thereby greatly alleviating a filter impairment of a signal.

In some embodiments, in the port plane, the plurality of first optical sub-signals and the plurality of second optical sub-signals are respectively incident to the first-band filter at a first forward incidence angle and a second forward incidence angle in the forward propagation direction, and both the first forward incidence angle and the second forward incidence angle fall within the second predetermined angle range. In this manner, this can further help reduce the filter spectrum shift of the first-band filter, thereby alleviating a filter impairment of a signal.

In some embodiments, the second predetermined angle range may be a range of 0±10 degrees, or 0±5 degrees, or 0±3 degrees. In this manner, the filter spectrum shift of the first-band filter can be further reduced by defining an angle of first incidence to the first-band filter in the port plane, thereby alleviating a filter impairment of a signal.

In some embodiments, in the port plane, the plurality of first optical sub-signals and the plurality of second optical sub-signals are respectively emitted from the light redirection device at a first emission angle and a second emission angle in the backward propagation direction, the first emission angle is approximately equal to or equal to the first backward incidence angle, and the second emission angle is approximately equal to or equal to the second backward incidence angle. In this manner, this can further help reduce the filter spectrum shift of the first-band filter, thereby alleviating a filter impairment of a signal. In addition, this manner can reduce complexity of coordination between devices.

In some embodiments, the wavelength selective switching apparatus further includes a first lens assembly, disposed between the light redirection device and the output port on an optical path, where the first lens assembly is configured to convert sub-band beams that are emitted from the light redirection device in a redirected manner at different angles into beams having different displacements in the port direction, so that beams of different sub-bands can be output from different output ports. This can help switching of a sub-band beam between different output ports.

In some embodiments, the wavelength selective switching apparatus further includes a second lens assembly, disposed between the dispersion assembly and the light redirection device on the optical path, and more preferably, positioned between the dispersion assembly and the first-band filter, where the second lens assembly is configured to respectively convert the first optical sub-signal and the second optical sub-signal that are emitted from the dispersion assembly at different angles into beams having different displacements in a dispersion plane of the first-band filter or the light redirection device. This can help spread different sub-band beams in the dispersion plane.

In some embodiments, the dispersion assembly includes a first grating, a second-band filter, and a second grating, where the second-band filter is configured to: reflect a first-band beam from the input port to the first grating and transmit a second-band beam from the input port to the second grating; the first grating and the second grating are configured to: disperse incident light in the forward propagation direction into the plurality of first optical sub-signals and the plurality of second optical sub-signals at different angles, and emit the plurality of first optical sub-signals and the plurality of second optical sub-signals to the second-band filter; and the second-band filter reflects the plurality of first optical sub-signals to the first-band filter, and transmits the plurality of second optical sub-signals to the first-band filter. This provides a simple implementation of the dispersion assembly.

In some embodiments, the plurality of first optical sub-signals and the plurality of second optical sub-signals are dispersed in the dispersion direction at roughly same positions of the first-band filter. This can reduce a size of the first-band filter in the dispersion direction and the size of the WSS module.

In some embodiments, in the dispersion plane, the plurality of first optical sub-signals and the plurality of second optical sub-signals are respectively incident to the first-band filter at a third forward incidence angle and a fourth forward incidence angle in the forward propagation direction, both the third forward incidence angle and the fourth forward incidence angle fall within a third predetermined angle range, and the third predetermined angle range does not include 0 degree and 90 degrees. In particular, in some embodiments, the third predetermined angle range is a range of 45±10 degrees or 45±5 degrees. This can further help reduce the filter spectrum shift of the first-band filter, thereby alleviating a filter impairment of a signal.

In some embodiments, in the dispersion plane, incidence angles of the plurality of first optical sub-signals and the plurality of second optical sub-signals relative to the light redirection device in the forward propagation direction are also within the second predetermined angle range (for example, a range of 0±10 degrees, 0±5 degrees, or 0±3 degrees). This can also help reduce the filter spectrum shift of the first-band filter, thereby alleviating a filter impairment of a signal because the light redirection component redirects an optical signal, resulting in change of an angle of incidence to a filter, and a smaller angle of incidence to the light redirection component may help reduce an angle of incidence to the first-band filter, thereby reducing the filter spectrum shift.

In some embodiments, the wavelength selective switching apparatus further includes a first polarization beam splitter, disposed between the at least one input port and the dispersion assembly on the optical path and configured to split the first-band optical signal and the second-band optical signal into an initial optical signal in a first polarization state and an initial optical signal in a second polarization state that are orthogonal to each other, where the initial optical signal in the first polarization state and the initial optical signal in the second polarization state have an angle or displacement difference in the dispersion direction; and a ½ wave plate, disposed between the first polarization beam splitter and the dispersion assembly on the optical path and configured to convert the initial optical signal in the first polarization state into a converted optical signal in a second polarization state.

In some embodiments, the dispersion assembly respectively disperses the initial optical signal in the second polarization state and the converted optical signal in the second polarization state into an initial sub-band signal in a second polarization state and a converted sub-band signal in a second polarization state; and an initial sub-band signal in the second polarization state and a converted sub-band signal in the second polarization state that have a same wavelength are incident to roughly same or close positions of the light redirection device at symmetrical or nearly symmetrical angles in the dispersion plane. This can reduce a size of the redirection device in the dispersion direction and the size of the WSS module.

In some embodiments, the wavelength selective switching apparatus may further include: a second polarization beam splitter, positioned between the dispersion assembly and the first-band filter; a first wave plate, positioned between the first-band filter and the second polarization beam splitter; and a second wave plate, positioned between the first-band filter and the light redirection device, where a second optical sub-signal of the initial sub-band signal in the second polarization state and the converted sub-band signal in the second polarization state sequentially passes through the second polarization beam splitter, the first wave plate, the first-band filter, and the second wave plate, and is incident to the light redirection device; and a sum of phase delays generated when the second optical sub-signal sequentially passes through the first wave plate and the second wave plate is approximately nπ, and n is an odd number. It is understood that splitting of a second sub-band from a multi-band signal may be achieved by using a combination of the second polarization beam splitter, the first wave plate, and the second wave plate.

In some embodiments, a first optical sub-signal of the initial sub-band signal in the second polarization state and the converted sub-band signal in the second polarization state sequentially passes through the second polarization beam splitter and the first wave plate, is reflected by the first-band filter and passes through the first wave plate for a second time, and is reflected by a polarization splitting film to the light redirection device; and a sum of phase delays generated when the first optical sub-signal passes through the first wave plate twice is approximately nπ, and n is an odd number. It is understood that splitting of a first sub-band from a multi-band signal may be achieved by using a combination of the second polarization beam splitter and the first wave plate.

In some embodiments, the wavelength selective switching apparatus further includes: a reflector, positioned between the light redirection device and the second polarization beam splitter and configured to reflect the first optical sub-signal reflected from the second polarization beam splitter to the light redirection device. This can allow the first-sub-band signal to be guided to an expected position.

In some embodiments, in the port plane, the first optical sub-signal incident to the second polarization beam splitter for a second time in the forward propagation direction is reflected by using the second polarization beam splitter, to split the first optical sub-signal and the second optical sub-signal in the port plane.

In some embodiments, the first optical sub-signal and the second optical sub-signal of the initial optical sub-signal in the second polarization state and the converted optical sub-signal in the second polarization state are incident to the polarization splitting film of the second polarization beam splitter at an incidence angle within a range of 45±10 degrees for a first time in the port plane.

In some embodiments, in the dispersion plane, the first optical sub-signal incident to the second polarization beam splitter for a second time in the forward propagation direction is reflected by using the second polarization beam splitter, to split the first optical sub-signal and the second optical sub-signal in the dispersion plane.

In some embodiments, the first optical sub-signal and the second optical sub-signal of the initial optical sub-signal in the second polarization state and the converted optical sub-signal in the second polarization state are incident to the polarization splitting film of the second polarization beam splitter at an incidence angle within a range of 45±10 degrees in the dispersion plane.

In some embodiments, in the dispersion plane, a plurality of first optical sub-signals and a plurality of second optical sub-signals of the initial optical sub-signal in the second polarization state and the converted optical sub-signal in the second polarization state are respectively incident to the first-band filter at a third forward incidence angle and a fourth forward incidence angle in the forward propagation direction, both the third forward incidence angle and the fourth forward incidence angle fall within a fourth predetermined angle range, and the fourth predetermined angle range is a range of 0±10 degrees or 0±5 degrees.

In some embodiments, the light redirection device is a single component, and the first optical sub-signal and the second optical sub-signal are incident on different areas of the single component. This can reduce a quantity of light redirection devices.

In some embodiments, the light redirection device includes a first light redirection device and a second light redirection device that are independent of each other, and the first light redirection device is configured to receive the first optical sub-signal and make the first optical sub-signal be emitted toward the first-band filter in a redirected manner; and the second light redirection device is configured to receive the second optical sub-signal, and make the second optical sub-signal be emitted toward the first-band filter in a redirected manner. This can increase freedom of WSS module design.

In some embodiments, the first wave plate is a ¼ wave plate, and the second wave plate is a ¼ wave plate. This can be beneficial to simplify the WSS module design by using polarization.

In some embodiments, a first-band beam is a C-band beam, and a second-band beam is an L-band beam.

In some embodiments, the light redirection device may be selected from a group including the following: an LCOS spatial light modulator, an LC spatial light modulator, and a MEMS spatial light modulator.

A second aspect of the present disclosure provides a wavelength selective switching method. The method includes: using an input port to input a first-band optical signal and a second-band optical signal; using a dispersion assembly to respectively disperse the input first-band optical signal and the input second-band optical signal into a plurality of first optical sub-signals and a plurality of second optical sub-signals in a dispersion plane, where the plurality of first optical sub-signals respectively correspond to a plurality of first sub-bands in a first band, the plurality of second optical sub-signals respectively correspond to a plurality of second sub-bands in a second band, and the dispersion plane is defined as a plane in which a light propagation direction and a dispersion direction are located; using a first-band filter to reflect the plurality of first optical sub-signals and transmit the plurality of second optical sub-signals; and using a light redirection device to receive the plurality of first optical sub-signals and the plurality of second optical sub-signals in a forward propagation direction from the first-band filter, and make, in a port plane, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, where the port plane is defined as a plane in which a predetermined arrangement direction of the plurality of output ports and the light propagation direction are located, the forward propagation direction is defined as an optical propagation direction from the input port to the light redirection device, and the backward propagation direction is defined as an optical propagation direction from the light redirection device to the output port; and both the first backward incidence angle and the second backward incidence angle are within a first predetermined angle range.

In some embodiments, the first predetermined angle range is a range of 0±20 degrees, 0±10 degrees, 0±5 degrees, or 0±3 degrees.

In some embodiments, in the port plane, the plurality of first optical sub-signals and the plurality of second optical sub-signals are respectively incident to the first-band filter at a first forward incidence angle and a second forward incidence angle in the forward propagation direction, and both the first forward incidence angle and the second forward incidence angle fall within the second predetermined angle range (for example, a range of 0±10 degrees or 0±5 degrees).

In some embodiments, in the port plane, the plurality of first optical sub-signals and the plurality of second optical sub-signals are respectively emitted from the light redirection device at a first emission angle and a second emission angle in the backward propagation direction, the first emission angle is approximately equal to or equal to the first backward incidence angle, and the second emission angle is approximately equal to or equal to the second backward incidence angle.

In some embodiments, the wavelength selective switching apparatus further includes a first lens assembly, disposed between the light redirection device and the output port on an optical path, where the first lens assembly is configured to convert beams of different sub-bands that are emitted from the light redirection device into beams having different displacements in the port direction, so that beams of different sub-bands can be output from different output ports.

In some embodiments, the wavelength selective switching apparatus further includes a second lens assembly, disposed between the dispersion assembly and the light redirection device on the optical path, where the second lens assembly is configured to respectively convert the first optical sub-signal and the second optical sub-signal that are emitted from the dispersion assembly at different angles into beams having different displacements in a dispersion plane of the light redirection device.

In some embodiments, the dispersion assembly includes a first grating, a second-band filter, and a second grating, where the second-band filter is configured to: reflect a first-band beam from the input port to the first grating and transmit a second-band beam from the input port to the second grating; the first grating and the second grating are configured to: disperse incident light in the forward propagation direction into the plurality of first optical sub-signals and the plurality of second optical sub-signals at different angles, and emit the plurality of first optical sub-signals and the plurality of second optical sub-signals to the second-band filter; and the second-band filter reflects the plurality of first optical sub-signals to the first-band filter, and transmits the plurality of second optical sub-signals to the first-band filter.

In some embodiments, the plurality of first optical sub-signals and the plurality of second optical sub-signals are dispersed in the dispersion direction at roughly same positions of the first-band filter.

In some embodiments, in the dispersion plane, forward incidence angles of the plurality of first optical sub-signals and the plurality of second optical sub-signals relative to the first-band filter in the forward propagation direction fall within a third predetermined angle range, and the third predetermined angle range does not include 0 degree and 90 degrees. In particular, the predetermined angle range is a range of 45±10 degrees or 45±5 degrees.

In some embodiments, in the dispersion plane, incidence angles of the plurality of first optical sub-signals and the plurality of second optical sub-signals relative to the light redirection device in the forward propagation direction are within the second predetermined angle range, for example, a range of 0±10 degrees or 0±5 degrees.

In some embodiments, the wavelength selective switching method further includes: using a first polarization beam splitter to split the input first-band optical signal and the input second-band optical signal into an initial optical signal in a first polarization state and an initial optical signal in a second polarization state that are orthogonal to each other, where the initial optical signal in the first polarization state and the initial optical signal in the second polarization state have an angle or displacement difference in the dispersion direction; and using a ½ wave plate to convert the initial optical signal in the first polarization state into a converted optical signal in a second polarization state.

In some embodiments, the wavelength selective switching method further includes: using the dispersion assembly to respectively disperse the initial optical signal in the second polarization state and the converted optical signal in the second polarization state into an initial sub-band signal in a second polarization state and a converted sub-band signal in a second polarization state, where each of the initial sub-band signal in the second polarization state and the converted sub-band signal in the second polarization state includes a plurality of first optical sub-signals and a plurality of second optical sub-signals; and an initial sub-band signal in the second polarization state and a converted sub-band signal in the second polarization state that have a same wavelength are incident to the light redirection device at symmetrical, nearly symmetrical, or substantially symmetrical angles in the dispersion plane.

In some embodiments, the wavelength selective switching method further includes: making a second optical sub-signal of the initial sub-band signal in the second polarization state and the converted sub-band signal in the second polarization state sequentially pass through the second polarization beam splitter, the first wave plate, the first-band filter, and the second wave plate, and be incident to the light redirection device, where a sum of phase delays generated when the second optical sub-signal sequentially passes through the first wave plate and the second wave plate is approximately nπ, and n is an odd number.

In some embodiments, the wavelength selective switching method further includes: making a first optical sub-signal of the initial sub-band signal in the second polarization state and the converted sub-band signal in the second polarization state sequentially pass through the second polarization beam splitter and the first wave plate, be reflected by the first-band filter and pass through the first wave plate for a second time, and be reflected by the second polarization beam splitter to the light redirection device, where a sum of phase delays generated when the first optical sub-signal passes through the first wave plate twice is approximately nπ, and n is an odd number.

In some embodiments, the wavelength selective switching method further includes: using a reflector to reflect the first optical sub-signal reflected from the second polarization beam splitter to the light redirection device.

In some embodiments, in the port plane, the first optical sub-signal incident to the second polarization beam splitter for a second time in the forward propagation direction is reflected by using the second polarization beam splitter, to split the first optical sub-signal and the second optical sub-signal in the port plane.

In some embodiments, the first optical sub-signal and the second optical sub-signal of the initial optical sub-signal in the second polarization state and the converted optical sub-signal in the second polarization state are incident to the polarization splitting film of the second polarization beam splitter at an incidence angle within a range of 45±10 degrees for a first time in the port plane.

In some embodiments, in the dispersion plane, the first optical sub-signal incident to the second polarization beam splitter for a second time in the forward propagation direction is reflected by using the second polarization beam splitter, to split the first optical sub-signal and the second optical sub-signal in the dispersion plane.

In some embodiments, the first optical sub-signal and the second optical sub-signal of the initial optical sub-signal in the second polarization state and the converted optical sub-signal in the second polarization state are incident to the polarization splitting film of the second polarization beam splitter at an incidence angle within a range of 45±10 degrees in the dispersion plane.

In some embodiments, in the dispersion plane, a plurality of first optical sub-signals and a plurality of second optical sub-signals of the initial optical sub-signal in the second polarization state and the converted optical sub-signal in the second polarization state are respectively incident to the first-band filter at a third forward incidence angle and a fourth forward incidence angle in the forward propagation direction, both the third forward incidence angle and the fourth forward incidence angle fall within a fourth predetermined angle range, and the fourth predetermined angle range is a range of 0±10 degrees or 0±5 degrees.

In some embodiments, the light redirection device is a single component, and the first optical sub-signal and the second optical sub-signal are incident on different areas of the single component.

In some embodiments, the light redirection device includes a first light redirection device and a second light redirection device that are independent of each other, and the first light redirection device is configured to receive the first optical sub-signal and make the first optical sub-signal be emitted toward the first-band filter in a redirected manner; and the second light redirection device is configured to receive the second optical sub-signal, and make the second optical sub-signal be emitted toward the first-band filter in a redirected manner.

In some embodiments, the first wave plate is a ¼ wave plate, and the second wave plate is a ¼ wave plate.

In some embodiments, the first-band beam is a C-band beam, and the second-band beam is an L-band beam.

In some embodiments, the light redirection device is selected from a group including the following: an LCOS spatial light modulator, an LC spatial light modulator, and a MEMS spatial light modulator.

A third aspect of the present disclosure further provides a reconfigurable optical add drop module (ROADM). The optical add drop module may include one or more wavelength selective switching apparatuses described in the first aspect.

It should also be further understood that the content described in the summary of the present invention is not intended to limit key or important features of the embodiments of the present disclosure or limit the scope of the present disclosure. Other features of the embodiments of the present disclosure will be readily understood from the following descriptions.

BRIEF DESCRIPTION OF DRAWINGS

The foregoing and other features, advantages, and aspects of various embodiments of the present disclosure will become more apparent in combination with the accompanying drawings and with reference to the following detailed descriptions. In the accompanying drawings, same or similar reference numerals indicate same or similar elements.

DESCRIPTION OF EMBODIMENTS

Description for Terms

Figure 1:
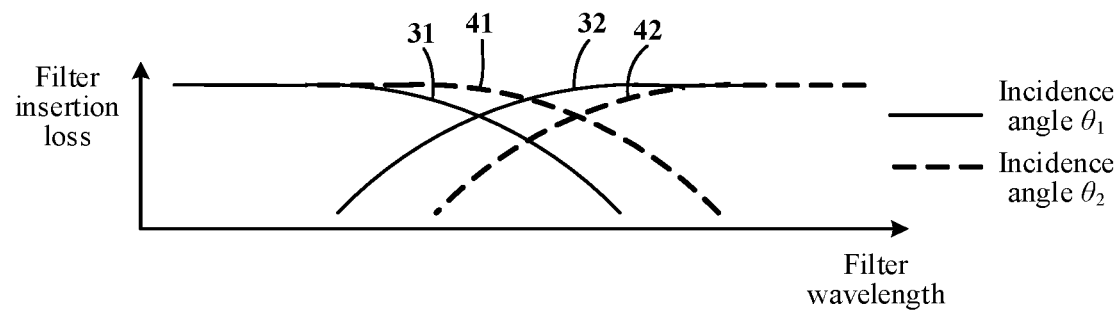
FIG. 1 is a schematic diagram showing that a filter spectrum of a band filter shifts with different incidence angles.

| English acronyms and abbreviations | Full English expression/ Standard English term | Chinese expression/ Chinese term |
|---|---|---|
| WSS | Wavelength Selective Switch | Wavelength Selective Switch |
| ADWSS | Add Drop WSS | Add Drop WSS |
| WDM | Wavelength Division Multiplexing | Wavelength Division Multiplexing |
| LCOS | Liquid Crystal on Silicon | Liquid Crystal on Silicon |
| LC | Liquid Crystal | Liquid Crystal |
| MEMS | Microelectromechanical Systems | Microelectromechanical Systems |

-continued

| English acronyms and abbreviations | Full English expression/ Standard English term | Chinese expression/ Chinese term |
|---|---|---|
| ROADM | Reconfigurable Optical Add Drop Module | Reconfigurable Optical Add Drop Module |
| AWG | Arrayed Waveguide Grating | Arrayed Waveguide Grating |
| PBS | Polarization Beam Splitter | Polarization Beam Splitter |

Embodiments of the present disclosure will be described in more detail below with reference to the accompanying drawings. Although some embodiments of the present disclosure are shown in the accompanying drawings, it should be understood that the present disclosure may be implemented in various forms and should not be construed as being limited to the embodiments described herein. On the contrary, these embodiments are provided for a more thorough and complete understanding of the present disclosure. It should be understood that the accompanying drawings and embodiments of the present disclosure are merely used as examples, but are not intended to limit the protection scope of the present disclosure.

At present, several band-division wavelength selective switching (WSS) schemes have been developed. As a typical technical scheme, in a paper K. Seno et al., "Wide-Passband C+L-band Wavelength Selective Switch by Alternating Wave-Band Arrangement on LCOS" in Proceedings of European Conference on Optical Communication (ECOC), 2018, the NTT company provides an example of a typical band-division WSS scheme. AWG waveguides that are arranged in parallel in a wavelength direction or a dispersion direction are used, so that a C-band beam and an L-band beam are emitted from the AWG at different angles in a port direction, and are vertically split and distributed in parallel in the port direction of a light redirection device (for example, an optical switch array) after passing through a lens. At the same time, by adjusting a position of an L-band AWG waveguide in a wavelength direction, the C-band beam and the L-band beam are incident to a grating at different angles in the wavelength direction after passing through the lens, but the C-band beam and the L-band beam are emitted from the grating at a same angle in the wavelength direction. Finally, positions of the C-band beam and the L-band beam are made to coincide in the wavelength direction of the light redirection device (for example, the optical switch array). A grating equation cited in this paper is as follows:

$$d(\sin \alpha + \sin \beta) = m\lambda \quad (1)$$

where $\alpha$ is an incidence angle of the grating, $\beta$ is an emission angle of the grating, d is a spacing between grating grooves, m is a diffraction order of the grating (usually first-order diffraction), and $\lambda$ is a wavelength of a beam. It can be learned from the formula (1) that, although the C-band beam and L-band beam have different wavelengths, the C-band beam and L-band beam may be made to generate different grating incidence angles in the wavelength direction through design, so that the C-band beam and L-band beam can generate a same grating incidence angle in the wavelength direction.

However, the typical technical scheme has the following disadvantages: A specially customized AWG waveguide is required. This increases insertion loss of optical coupling between the waveguide and space. If the C-band beam and L-band beam are incident to the grating at different angles in the wavelength direction, a length or a size of a component of an input/output optical path of a module in a wavelength direction or a dispersion direction is increased.

For this, the embodiments of the present disclosure provide a novel wavelength selective switching apparatus. The apparatus at least does not need to customize an AWG waveguide, and/or at least can reduce the size of the component of the input/output optical path in the wavelength direction or the dispersion direction. In particular, according to the wavelength selective switching apparatus of the present disclosure, a filter spectrum shift of a band filter can be reduced during optical signal switching in a port direction, thereby alleviating a filter impairment of an optical signal.

An idea of the present disclosure is: using a band filter (for example, a C/L filter) to perform band-division processing on a multi-band optical signal. Further, at least in a port plane or a port direction, a beam emitted from a light redirection device (for example, an optical switch array) is enabled to be incident to the band filter (for example, a C/L filter) at an angle within a first predetermined angle range in a backward propagation direction, for example, may be incident to the band filter (for example, a C/L filter) at a small incidence angle (for example, within a range of −20 degrees to +20 degrees, within a range of −10 degrees to +10 degrees, more particularly, within a range of −5 degrees to +5 degrees, or more particularly, within a range of −3 degrees to +3 degrees). It will be understood that by designing that an incidence angle in the port plane is within a predetermined angle range, when the light redirection device (for example, the optical switch array) switches a beam at a different predetermined angle (for example, −3 degrees to +3 degrees, or even a greater switching angle) in the port plane. In this case, the filter spectrum of the band filter (for example, a C/L filter) has only a relatively small (for example, less than +/−1 nm) shift, so that a filter impairment of an optical signal can be alleviated.

In addition, the WSS apparatus of the present disclosure may not be limited to processing a multi-band optical signal including a C-band and an L-band, but may process a multi-band (which may further include, for example, an S-band) optical signal including a C-band and an L-band or bands other than a C-band and an L-band. Performance of the WSS apparatus of the present disclosure may be equivalent to filtering performance of a WSS apparatus that processes only a C band. Further, the WSS apparatus of the present disclosure may further share a plurality of optical components, a size of a module is increased as little as possible, and a specially customized waveguide component does not need to be added.

As known to a person skilled in the art, a band filter (for example, a C/L filter) is usually implemented by using a coating technology of a multi-layer dielectric film. When an incidence angle (an included angle between a beam propagation direction and a filter normal) is large (for example, 45 degrees), a filter spectrum of a film filter is very sensitive to a change of an incidence angle of a beam. In this case, if the incidence angle of the band filter changes, the filter spectrum of the band filter also shifts and changes to a large extent. A rule of filter spectrum shift may be described by using the following formula (2):

$$\lambda_\theta = \lambda_0 \sqrt{1 - \left(\frac{n_0}{n_{\it eff}}\sin\theta\right)^2} \quad (2)$$

where θ is an angle at which a light beam is incident to the film filter, $\lambda_0$ is an edge wavelength of a filter spectrum when an incidence angle is 0, $\lambda_\theta$ is an edge wavelength of the filter spectrum when the incidence angle is θ, $n_0$ is a refractive index of incidence and emission material media, and $n_{eff}$ is an effective refractive index of a film material medium.

FIG. 1 schematically shows change of a filter spectrum of a band filter as an incidence angle. Solid lines 31 and 32 respectively show filter spectra of a C band and an L band when an incidence angle is $θ_1$. Dashed lines 41 and 42 respectively show, as examples, filter spectra of the C band and the L band when the incidence angle is $θ_2$. It can be learned from FIG. 1 that a smaller incidence angle or smaller angle change of a normal for the band filter (for example, a C/L filter) indicates a smaller filter spectrum shift, thereby effectively alleviating a filter impairment. Further, the inventor of this application also realizes that by limiting the incidence angle of the optical signal in the port plane of the WSS apparatus (for example, making the optical signal be incident to the band filter at a small angle in the backward propagation direction in the port plane), this may not only help reduce the change of the incidence angle of the normal for the band filter (for example, a C/L filter), but also help relax a limitation of the incidence angle of the optical signal relative to the normal of the band filter. Calculation and/or experiments show that according to the embodiments of the present disclosure, a filter spectrum shift during optical signal switching in the port plane may even be made to be controlled within a range of +/−1 nm, thereby greatly alleviating a filter impairment when the WSS module performs optical signal switching.

Various example embodiments of the present disclosure are described below with particular reference to FIG. 1 to FIG. 13.

First of all, it should be noted herein that: As used herein, the term "forward propagation direction" is defined as a light propagation direction from an input port to a light redirection device. The term "backward propagation direction" is defined as an optical propagation direction from a light redirection device to an output port. The term "port direction" is defined as a predetermined arrangement direction of a plurality of output ports. The term "port plane" is defined as a plane in which a port direction and an optical propagation direction are located. The term "dispersion direction or wavelength direction" is defined as a wavelength splitting direction. The term "dispersion plane" is defined as a plane in which a dispersion direction and an optical propagation direction are located. The term "optical band" may have a same meaning as "optical signal" and the two may be used interchangeably.

In addition, the term "forward incidence angle" is an incidence angle incident to a device in a forward propagation direction. The term "backward incidence angle" is an incidence angle incident to a device in a backward propagation direction. It also needs to be particularly noted that: the key expression "in a port/dispersion plane, . . . an incidence/emission angle" or similar terms in the present disclosure refers to a projection angle of an optical signal in a corresponding port/dispersion plane relative to an incidence/emission angle of a normal of a device, to distinguish from an incidence/emission angle of an optical signal relative to a normal of a device in a conventional sense.

In addition, approximate words such as "approximately", "substantially", "nearly", "roughly", or "about" herein are intended to indicate an error range of an involved value, for example, an error range of ±20%, an error range of ±10%, an error range of ±55%, an error range of ±3%, or an error range of ±1% of the involved value. In particular, for an angle, the approximate words indicate a range of ±20 degrees, a range of ±10 degrees, a range of ±5 degrees, a range of ±3 degrees, or a range of ±1 degrees of the angle. In addition, a range of a numerical expression "A+B" may have a same meaning as an expression "from A−B to A+B", and the two may be used interchangeably.

In addition, for ease of description, the dispersion direction or the wavelength direction may be expressed as X, the port direction may be expressed as Y, and the optical propagation direction may be expressed as Z. Therefore, the port plane may be expressed as an X-Z plane, and the dispersion plane may be expressed as a Y-Z plane.

First Example Embodiment

Figure 2:
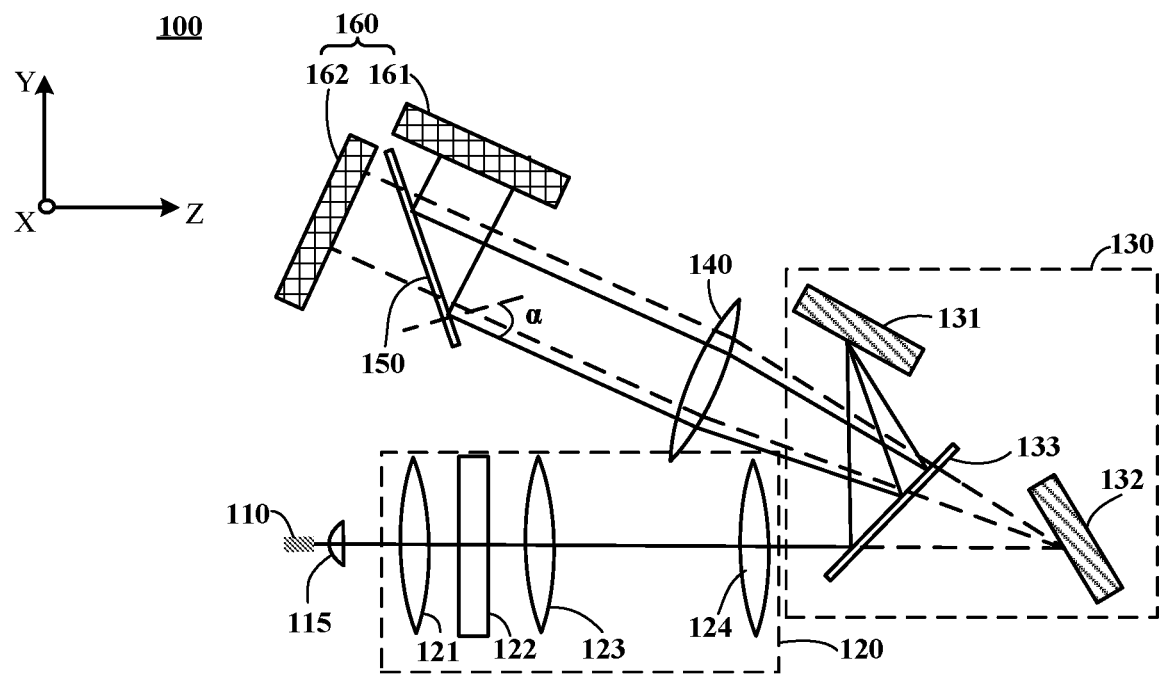
FIG. 2 is a schematic diagram of a structure of a wavelength selective switching apparatus in a dispersion plane according to a first example embodiment of the present disclosure.
Figure 3:
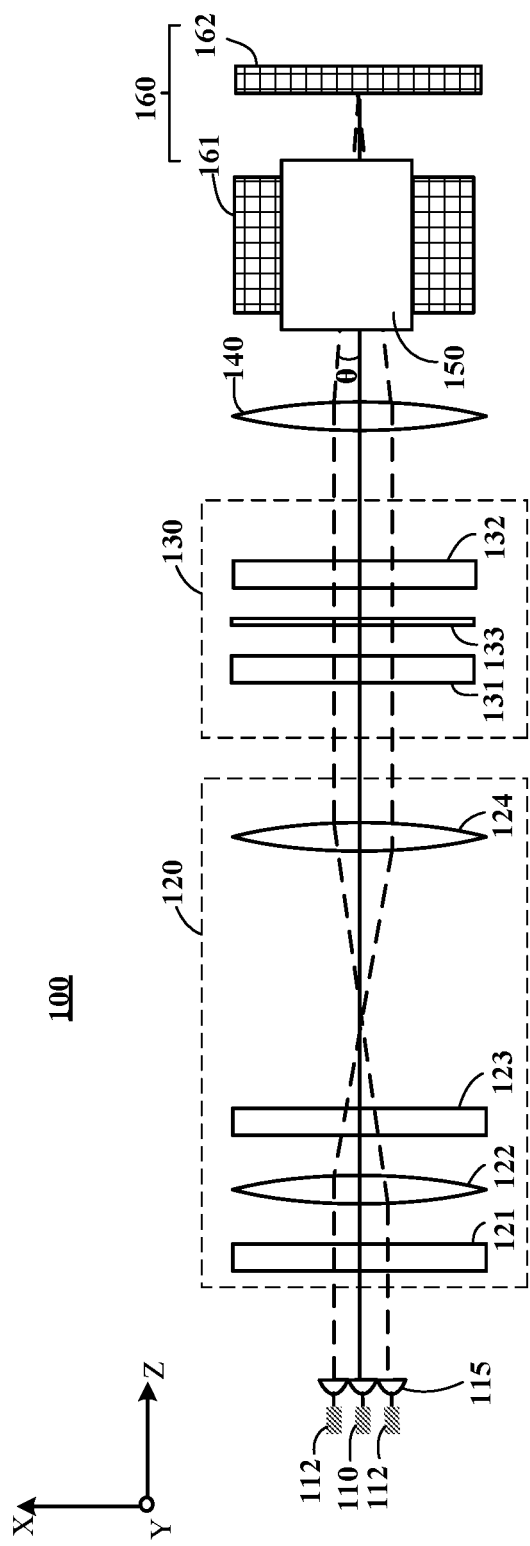
FIG. 3 is a schematic diagram of a structure of a wavelength selective switching apparatus in a port plane according to a first example embodiment of the present disclosure.
Figure 4A:
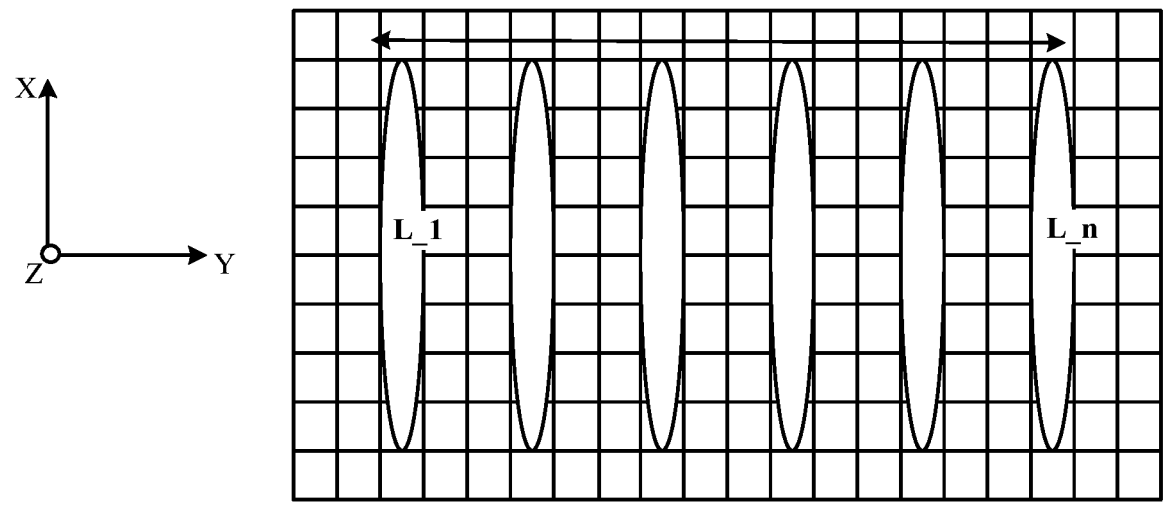
FIG. 4a is a schematic diagram of distribution of light spots of a second sub-band on a surface of a light redirection device according to a first example embodiment of the present disclosure.
Figure 4B:
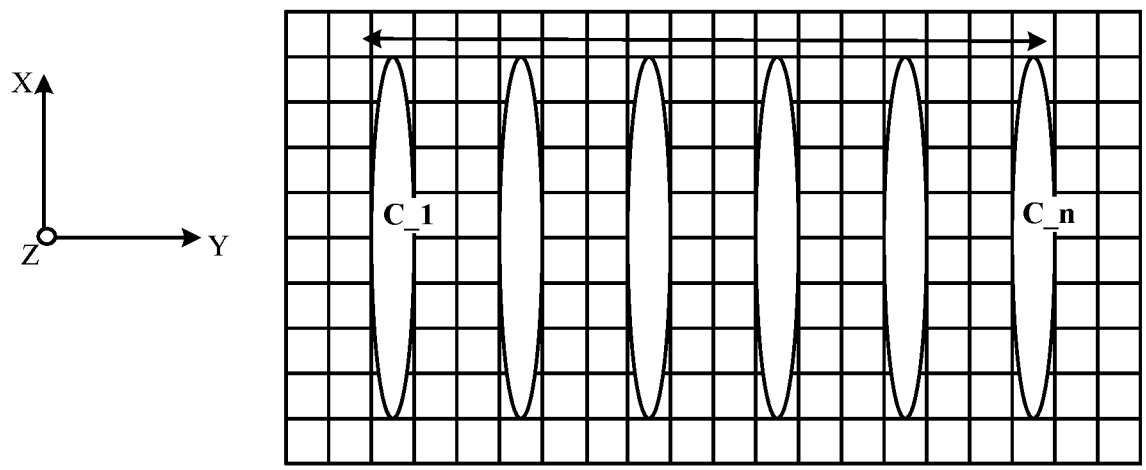
FIG. 4b is a schematic diagram of distribution of light spots of a first sub-band on a surface of a light redirection device according to a first example embodiment of the present disclosure.

FIG. 2 to FIG. 4b show implementations of a first example embodiment of a wavelength selective switching apparatus according to the present disclosure. FIG. 2 and FIG. 3 are respectively schematic diagrams of structures of wavelength selective switching apparatuses in a dispersion plane and a port plane. FIG. 4a and FIG. 4b are respectively schematic diagrams of distribution of light spots of a second sub-band and a first sub-band on a surface of a light redirection device.

As shown in FIG. 2 and FIG. 3, a wavelength selective switching apparatus 100 may include at least one input port 110, a plurality of output ports 112, a first lens assembly 120, a dispersion assembly 130, a second lens assembly 140, a first-band filter 150, and a light redirection device 160.

A function of the at least one input port 110 is to receive a multi-band optical signal as an external input, and input the multi-band optical signal to the dispersion assembly 130. The multi-band optical signal may include at least a first-band optical signal and a second-band optical signal. As an example only, the multi-band optical signal may be a multi-band optical signal of C+L bands, but is not limited thereto. The plurality of output ports 112 are configured to output an optical signal of a band range that is expected to be switched to (or selected). In some embodiments, the at least one input port 110 and the plurality of output ports 112 may be arranged together to form an input/output port array, but this is not a limitation. In other embodiments, an output port array may alternatively be arranged away from an input port. As an example, an array may include, but is not limited to, a one-dimensional or two-dimensional array. In a further embodiment, an input/output port may be connected, for example, through an optical fiber (or an optical fiber array).

In some embodiments, a multi-band optical signal input from the at least one input port 110 may be collimated by using a collimator mirror 115. It will be understood that the collimator mirror 115 is optional and may be omitted, for example, when input light has been collimated.

The first lens assembly 120 is disposed between the input/output port and the dispersion assembly 130, and a function of the first lens assembly 120 is to perform light spot shaping on a multi-band optical signal from the at least one input port 110, and convert sub-band beams emitted from the light redirection device 160 in a redirected manner at different angles into beams having different displacements in the port direction, so that beams of different sub-bands can be output from different output ports. This can conveniently switch or select an expected band range. Likewise, it will be understood that the first lens assembly 120 may also be optional because it is possible that light spot shaping is not needed and that the light redirection device 160 may be operated to directly redirect a dispersed expected band optical signal to the output port.

Herein, as an example only, the first lens assembly 120 may include a combination of a first lens 121, a second lens 122, a third lens 123, and a fourth lens 124. As an example of a lens structure, in some embodiments, the first lens 121 and the third lens 123 may be, for example, cylindrical lenses that have curvature only in a dispersion direction and have no curvature in a port direction. In some other embodiments, the second lens 122 may be a cylindrical lens that has curvature only in a port direction and has no curvature in a dispersion direction. In some other embodiments, the fourth lens 124 may be a spherical lens that has curvature in both a port direction and a dispersion direction. In some other embodiments, a position of a rear focus of the first lens 121 may coincide with that of a front focus of the third lens 123. In some other embodiments, a rear focus of the third lens 123 may coincide with a front focus of the fourth lens 124. In some other embodiments, a grating (which will be further described later) in the dispersion assembly 130 may be located at a rear focus of the fourth lens 124. In some other embodiments, a position of a front focus of the first lens 121 may coincide with that of a rear focus of the collimator mirror 115.

The dispersion assembly 130 may be disposed between the input/output port and the first-band filter 150, and a function of the dispersion assembly 130 is to respectively disperse a first-band optical signal and a second-band optical signal that are propagated forward from the input port 110 into a plurality of first optical sub-signals and a plurality of second optical sub-signals in a dispersion plane, and propagate the plurality of dispersed first optical sub-signals and the plurality of dispersed second optical sub-signals to the first-band filter 150.

As an example only, the dispersion assembly 130 may include a first grating 131, a second-band filter 133, and a second grating 132. The second-band filter 133 (for example, a C/L-band filter) is configured to reflect a first-band (for example, C-band) beam from the input port 110 to the first grating 131, and transmit a second-band (for example, L-band) beam from the input port 110 to the second grating 132. The first grating 131 may also be arranged to disperse the incident first-band (for example, C-band) optical signal into a first optical sub-signal in a dispersion direction Y (that is, a direction vertical to a grating groove) and return the first optical sub-signal to the second-band filter 133. The second grating 132 may also be arranged to disperse the incident second-band (for example, L-band) optical signal into a second optical sub-signal in a dispersion direction Y (that is, a direction vertical to a grating groove) and return the second optical sub-signal to the second-band filter 133.

In an embodiment in which the dispersion assembly 130 includes the first grating 131 and the second grating 132, the first grating 131 and the second grating 132 may be positioned at a rear focus of the fourth lens 124.

It will be understood that a primary function of the second-band filter 133 is to split the first band and the second band and propagate light to the first grating 131 and the second grating 132. However, in other embodiments, it is also possible that only a grating structure exists in the dispersion assembly 130 and the second-band filter 133 does not exist. In this case, the grating structure may directly disperse a multi-band optical signal into a first optical sub-signal and a second optical sub-signal, and project the first optical sub-signal and the second optical sub-signal to the first-band filter 150.

The second lens assembly 140 may be positioned between the dispersion assembly 130 and the first-band filter 150, and is configured to respectively convert the first optical sub-signal and the second optical sub-signal that are emitted from the dispersion assembly 130 at different angles into beams that have different displacements in a dispersion plane of the first-band filter 150 or the light redirection device. In examples of FIG. 2 and FIG. 3, the second lens assembly 140 is illustrated as a single lens, such as a spherical lens that has curvature in both the dispersion direction and the port direction. As a further example, the first grating 131 and the second grating 132 described earlier may be positioned at a front focus of the second lens assembly 140, and the light redirection device 160 described later may be positioned at a rear focus of the second lens assembly 140. The front focus of the second lens assembly 140 may coincide with the rear focus of the first lens assembly 120 (or the fourth lens 124). It will be understood that the second lens assembly 140 is also optional. In some embodiments, the second lens assembly 140 may be omitted. Therefore, an optical signal is incident directly from the dispersion assembly 130 to the first-band filter 150.

The first-band filter 150 may be constructed to reflect a first-band optical signal or a plurality of first optical sub-signals and transmit a second-band optical signal or a plurality of second optical sub-signals, and the reflected or transmitted optical signal may be incident to the light redirection device 160. In an example of FIG. 2, the light redirection device 160 is shown to include a first light redirection device 161 and a second light redirection device 162. In this case, a plurality of first-sub-band (for example, C-band) optical signals may be reflected by the first-band filter 150 to the first light redirection device 161, and a plurality of second-sub-band (for example, L-band) optical signals may be transmitted by the first-band filter 150 to the second light redirection device 162. It will be understood that, in some embodiments, it is also possible that the light redirection device 160 includes a single device. In this case, an optical signal reflected or transmitted from the first-band filter 150 may be guided to different areas of the single light redirection device 160 by, for example, a mirror.

As an example only, the light redirection device may include, but is not limited to, a switching element array such as an LCOS spatial light modulator, an LC spatial light modulator, and a MEMS spatial light modulator.

The following describes an optical path condition of the wavelength selective switching apparatus in the dispersion plane according to a second example embodiment of the present disclosure with reference to FIG. 2.

It can be learned from FIG. 2 that, in a dispersion plane, a multi-band (for example, C+L-band) optical signal may be input from the input port 110 and collimated by the collimator mirror 115, and beam shaping is performed by the first lens 121 and the third lens 123 on a beam obtained through collimation to change a size of a light spot. The shaped beam is incident from the fourth lens 124 to the second-band filter 133 (for example, a C/L filter). The second-band filter 133 splits the first-band (for example, C-band) beam and the second-band (for example, L-band) beam in different emission directions in a wavelength direction or a dispersion direction, for example, reflects the first-band beam (for example, a C-band beam) and transmits the second-band beam (for example, an L-band beam) and respectively propagates the first-band beam and the second-band beam to the first grating 131 (for example, a C-band grating) and the second grating 132 (for example, an L-band grating). The first grating 131 disperses the first-band beam into a plurality of first optical sub-signals along different angles, and the plurality of first optical sub-signals are incident to the second-band filter 133 (for example, a C/L filter). The second grating 132 disperses the second-band beam into a plurality of second optical sub-signals along different angles, and the plurality of second optical sub-signals are incident to the second-band filter 133 (for example, a C/L filter).

In some embodiments, the plurality of first optical sub-signals (for example, C-sub-band beams) and the plurality of second optical sub-signals (for example, L-sub-band beams) may be propagated to a same position or close positions of the second-band filter 133 (for example, a C/L filter) in a wavelength direction.

As an example, assuming that the first band is a C band and the second band is an L band, a start sub-band beam C_1 of the C band is 1524 nm, an end sub-band beam C_n of the C band is 1572 nm, a start sub-band beam L_1 of the L band is 1575 nm, and an end sub-band beam L_n of the L band is 1623 nm. When the C_1-sub-band beam and the L_1-sub-band beam are propagated to the second-band filter 133 (for example, a C/L filter), the C_1-sub-band beam and the L_1-sub-band beam may be located at a same position or close positions of the second-band filter 133 in a wavelength direction or a dispersion direction. When the C_n-sub-band beam and the L_n-sub-band beam are propagated to the second-band filter 133 (for example, a C/L filter), the C_n-sub-band beam and the L_n-sub-band beam may be located at a same position or close positions of the second-band filter 133 in the wavelength direction or the dispersion direction. In this manner, this can help reduce a size of a dispersion assembly module, and share an optical device to a maximum extent.

However, it will be understood that it is also possible that the plurality of first optical sub-signals (for example, C-sub-band beams) and a plurality of second optical sub-signals (for example, L-sub-band beams) are made to be propagated to different positions of the second-band filter 133 (for example, a C/L filter) in the wavelength direction or the dispersion direction. In this case, for example, the first-optical-band (for example, C-band) signal and the second-optical-band (for example, L-band) signal may be input to the wavelength selective switching apparatus by using one input port each.

The second-band filter 133 (for example, a C/L filter) may aggregate the plurality of first optical sub-signals (for example, C-sub-band beams) and the plurality of second optical sub-signals (for example, L-sub-band beams) along a same or close emission direction in the wavelength direction or the dispersion direction. In some embodiments, the plurality of aggregated first optical sub-signals (for example, C-sub-band beams) and the plurality of aggregated second optical sub-signals (for example, L-sub-band beams) may be incident to the first-band filter 150 through the second lens assembly 140. The second lens assembly 140 may convert an angle difference between the sub-band beams in a wavelength direction into a position difference in a wavelength direction or a dispersion direction of the first-band filter 150.

In some embodiments, the plurality of first optical sub-signals (for example, C-sub-band beams) and the plurality of second optical sub-signals (for example, L-sub-band beams) may be forward propagated to a same position or close positions of the first-band filter 150 in a wavelength direction or a dispersion direction. As an example, for example, the C_1-sub-band beam and the L_1-sub-band beam may be propagated to a same position or close positions of the first-band filter 150 in the wavelength direction, and the C_n-sub-band beam and the L_n-sub-band beam may be propagated to a same position or close positions of the first-band filter 150 in the wavelength direction. Likewise, it will be understood that it is also possible that the plurality of corresponding first optical sub-signals (for example, C-sub-band beams) and the plurality of corresponding second optical sub-signals (for example, L-sub-band beams) are made to be propagated, in the forward propagation direction, to different positions of the first-band filter 150 in the wavelength direction.

The first-band filter 150 may forward propagate the plurality of first optical sub-signals (for example, C-sub-band beams) and the plurality of second optical sub-signals (for example, L-sub-band beams) to the light redirection device 160. The light redirection device 160 is shown in FIG. 2 and FIG. 3 to include the first light redirection device 161 and the second light redirection device 162. As an example, the first-band filter 150 may, for example, transmit the plurality of second optical sub-signals (for example, L-sub-band beams) and reflect the plurality of first optical sub-signals (for example, C-sub-band beams). The plurality of first optical sub-signals (for example, C-sub-band beams) may then be propagated to the first light redirection device 161, and the plurality of second optical sub-signals (for example, L-sub-band beams) may then be propagated to the second light redirection device 162.

In some embodiments, in the dispersion plane, the plurality of first optical sub-signals and the plurality of second optical sub-signals may be respectively incident to the first-band filter 150 at a third forward incidence angle and a fourth forward incidence angle in the forward propagation direction, the third forward incidence angle and the fourth forward incidence angle may fall within a third predetermined angle range, and the third predetermined angle range does not include 0 degree and 90 degrees. As an example, for example, optionally, the third forward incidence angle and the fourth forward incidence angle may be both within a range of 45±10 degrees or 45±5 degrees. It will be understood that an incidence angle of 45 degrees may facilitate a 90 degree deflection of a reflected beam relative to an incident beam, thereby facilitating placement of an optical device, but this is not a limitation. The third forward incidence angle and the fourth forward incidence angle of other angles are also possible. In some embodiments, the third forward incidence angle and the fourth forward incidence angle may be equal, and may be represented by, for example, a in FIG. 2. Further, in some embodiments, in the dispersion plane, an angle of incidence from the first-band filter 150 to the light redirection device 160 may be 0±10 degrees, 0±5 degrees, or another angle. In particular, 0 degree is advantageous, indicating being incident to the light redirection device 160 vertically or almost vertically.

The light redirection device 160 may emit, in a redirected manner, the plurality of first optical sub-signals and the plurality of second optical sub-signals that are incident to the light redirection device 160 in a backward propagation direction (in this case, the plurality of first optical sub-signals and the plurality of second optical sub-signals may be selectively switched to a port direction), and then propagate the plurality of first optical sub-signals and the plurality of second optical sub-signals to the output port 112.

In some embodiments, to maximize device sharing, the light redirection device 160 may make the redirected beams of different sub-bands be propagated to the output port 112 through the first-band filter 150, the second lens assembly 140, the dispersion assembly 130, the first lens assembly 120, and the collimator mirror 115 in the backward propagation direction.

In the example of FIG. 2, in the dispersion plane, the light redirection device 160 may make a sub-band beam be reflected in such a manner that an incidence angle is equal to a reflection angle. As an example, in the dispersion plane, the light redirection device 160 may make a sub-band beam be incident to the first-band filter 150 at an angle, for example, within a range of 45±10 degrees or 45±5 degrees. It will be understood that 45 degrees is advantageous, indicating that a reflected beam is enabled to be deflected at a right angle. In addition, it is also possible that the light redirection device 160 makes a sub-band beam be incident to the first-band filter 150 at an angle other than 45 degrees.

In some embodiments, the first-band filter 150 may combine the plurality of redirected first optical sub-signals (for example, C-sub-band beams) and the plurality of redirected second optical sub-signals (for example, L-sub-band beams) that are incident to the first-band filter 150 into a plurality of sub-band beams (for example, C+L-sub-band beam) and then backward propagate the plurality of sub-band beams to the dispersion assembly 130 through the second lens assembly 140. Then, the first grating 131 (for example, a C-band grating) in the dispersion assembly 130 may combine the first optical sub-signals into a first-band beam (for example, a C-band beam), and the second grating 132 (for example, an L-band grating) may combine the second optical sub-signals (for example, L-sub-band beams) into a second-band beam (for example, an L-band beam). The second-band filter 133 may combine the first-band beam (for example, a C-band beam) and the second-band beam (for example, an L-band beam) into a multi-band beam (for example, a C+L beam).

It should be noted that in some embodiments, in either the forward propagation direction or the backward propagation direction, the plurality of first optical sub-signals (for example, C-sub-band beams) and the plurality of second optical sub-signals (for example, L-sub-band beams) may be made to be propagated to a same position or close positions of the first-band filter 150 in a wavelength direction or a dispersion direction. As an example only, the C_1-sub-band beam and the L_1-sub-band beam may be forward or backward propagated to a same position or close positions of the first-band filter 150 in the wavelength direction or the dispersion direction, and the C_n-sub-band beam and the L_n-sub-band beam may be forward or backward propagated to a same position or close positions of the first-band filter 150 in the wavelength direction or the dispersion direction. In this manner, sizes of the first-band filter 150 and the wavelength selective switching apparatus in the wavelength direction or the dispersion direction can be greatly reduced.

However, it will be understood that it is also possible that the plurality of corresponding first optical sub-signals (for example, C-sub-band beams) and the plurality of corresponding second optical sub-signals (for example, L-sub-band beams) are made to be propagated, in the forward or backward propagation direction, to different positions of the first-band filter 150 in the wavelength direction. In this case, for example, the first-band optical signal and the second-band optical signal may be input to the WSS by using one input port each.

The following describes an optical path condition of the wavelength selective switching apparatus in the port plane according to the first example embodiment of the present disclosure with reference to FIG. 3.

As can be seen from FIG. 3, in the port plane, a multi-band beam (for example, a C+L-band beam) may be input from the input port 110. The beam collimated by the collimator mirror 115 may be incident to the first-band filter 150 through the second lens 122, the fourth lens 124, the dispersion assembly 130, and the second lens assembly 140, and then be propagate to the light redirection device 160.

Herein, it is assumed that in the port plane, the plurality of first optical sub-signals (for example, C-band) and the plurality of second optical sub-signals (for example, L-band) are respectively incident to the first-band filter 150 at a first forward incidence angle and a second forward incidence angle in the forward propagation direction. The plurality of first optical sub-signals and the plurality of second optical sub-signals are respectively emitted from the first-band filter 150 at a first forward emission angle and a second forward emission angle in the forward propagation direction. In addition, it is assumed that in the port plane, the plurality of first optical sub-signals (for example, C-band) and the plurality of second optical sub-signals (for example, L-band) that are emitted from the first-band filter 150 are respectively incident to the light redirection device 160 at a first incidence angle and a second incidence angle in the forward propagation direction. The plurality of first optical sub-signals and the plurality of second optical sub-signals are respectively emitted from the light redirection device 160 at a first emission angle and a second emission angle in the backward propagation direction. In addition, it is assumed that in the port plane, the plurality of first optical sub-signals (for example, C-band) and the plurality of second optical sub-signals (for example, L-band) that are emitted from the light redirection device 160 are respectively incident to the first-band filter 150 at a first backward incidence angle and a second backward incidence angle in the backward propagation direction.

Particularly advantageously, both the first backward incidence angle and the second backward incidence angle are within a first predetermined angle range. As an example only, the first predetermined angle range may be a range of 0±20 degrees, 0±10 degrees, 0±5 degrees, or 0±3 degrees.

In some embodiments, the first forward incidence angle, the second forward incidence angle, the first forward emission angle, or the second forward emission angle may be within a second predetermined angle range. As an example only, the second predetermined angle range is, for example, a range of −10 degrees to +10 degrees, a range of −5 degrees to +5 degrees, in particular, a range of −3 degrees to +3 degrees, or more particularly 0 degree. This means that in the port plane, the plurality of first optical sub-signals and the plurality of second optical sub-signals may be incident to and emitted from the first-band filter 150 in a nearly vertical or completely vertical manner in the forward propagation direction.

Particularly advantageously, in some embodiments, the first incidence angle or the second incidence angle of incidence to the light redirection device may alternatively be, for example, within a range of −5 degrees to +5 degrees, in particular, a range of −3 degrees to +3 degrees, or more particularly 0 degree. This means that, in the port plane, the plurality of first optical sub-signals and the plurality of second optical sub-signals may be incident to the light redirection device 160 in a nearly vertical or completely vertical manner in the forward propagation direction.

The light redirection device 160 may make the plurality of first optical sub-signals and the plurality of second optical sub-signals that are incident to the light redirection device 160 be respectively emitted at the first emission angle and the second emission angle in a redirected manner. Particularly advantageously, in some embodiments, a range of the first emission angle and the second emission angle may be a range of −20 degrees to +20 degrees, a range of −10 degrees to +10 degrees or a range of −5 degrees to +5 degrees, in particular, a range of −3 degrees to +3 degrees. In a further embodiment, the first emission angle may be approximately equal to or equal to the first backward incidence angle, and the second emission angle may be equal to the second backward incidence angle.

It will be understood that the first forward incidence angle, the second forward incidence angle, the first forward emission angle, the second forward emission angle, the first backward incidence angle, or the second backward incidence angle in the port plane are designed by using the angle range designed above. Change of an angle of incidence to the first-band filter when the light redirection device 160 performs signal switching in the port direction may be advantageously made to be greatly reduced. This helps alleviate a filter impairment.

To better understand advantages of designing the angle range, as an example only, assuming that an included angle between a beam incident to the first-band filter 150 in the backward propagation direction and the normal of the first-band filter 150 is γ (that is, an incidence angle relative to a normal in the general sense), θ is an angle at which the beam in the backward propagation direction is incident to the first-band filter 150 in the port plane (that is, corresponding to the first backward incidence angle or the second backward incidence angle), and α is an angle at which the beam in the backward propagation direction is incident to the first-band filter 150 in the dispersion plane, a relationship between γ, and α and θ is determined by a formula (3).

$$\frac{1}{\cos\gamma * \cos\gamma} = \frac{1}{\cos\alpha * \cos\alpha} + \frac{1}{\cos\theta * \cos\theta} - 1 \quad (3)$$

According to the design of the embodiments of the present disclosure, the θ angle in the port plane should be a small angle (that is, even if a signal switching angle of the light redirection device is taken into account, the θ angle is also a small incidence angle in the port plane), and, for example, within a range of 0±20 degrees, 0±10 degrees, 0±5 degrees, or 0±3 degrees. Herein, assuming that α=45 degrees and θ=3 degrees, γ=45.04 degrees.

It will be understood that compared with a case in which a large backward incidence angle is designed in the port plane (it should be noted: in this case, even if that the signal switching angle of the light redirection device is 0 is taken into account, the light redirection device still has a large backward incidence angle (for example, 45 degrees)), when the same signal switching angle of the light redirection device is applied, change of an incidence angle between the optical signal and the normal of the first-band filter according to the embodiment of the present disclosure can be greatly reduced. Further, according to the formula (2), it will be understood that this can greatly reduce the filter spectral shift of the first-band filter. Through experiments and calculation, according to the example embodiment of the present disclosure, the filter spectrum shift can even be in a range of less than +/−1 nm. This greatly alleviates a filter impairment of a signal.

In some embodiments, the light redirection device 160 may be at a rear focus position of the second lens assembly 140. In some other embodiments, a position of a rear focus of the first lens assembly 120 or the fourth lens 124 may coincide with that of a front focus of the second lens assembly 140. In some other embodiments, a position of a front focus of the fourth lens 124 may coincide with that of a rear focus of the second lens 122. In some other embodiments, a position of a front focus of the second lens 122 coincides with that of a rear focus of the collimator mirror 115.

As previously described, the first lens assembly 120 is configured to convert sub-band beams that are emitted from the light redirection device 160 in a redirected manner at different angles into beams having different displacements in the port direction. As an example only, the conversion may be achieved, for example, in particular by the second lens 122 in the first lens assembly 120. In particular, the second lens 122 may be a cylindrical lens that has curvature only in the port direction and has no curvature in the dispersion direction.

FIG. 4a and FIG. 4b respectively show distribution of light spots of the plurality of second sub-bands (for example, L sub-bands) and the plurality of first sub-bands (for example, C sub-bands) on the light redirection device 160.

Second Example Embodiment

Figure 6:
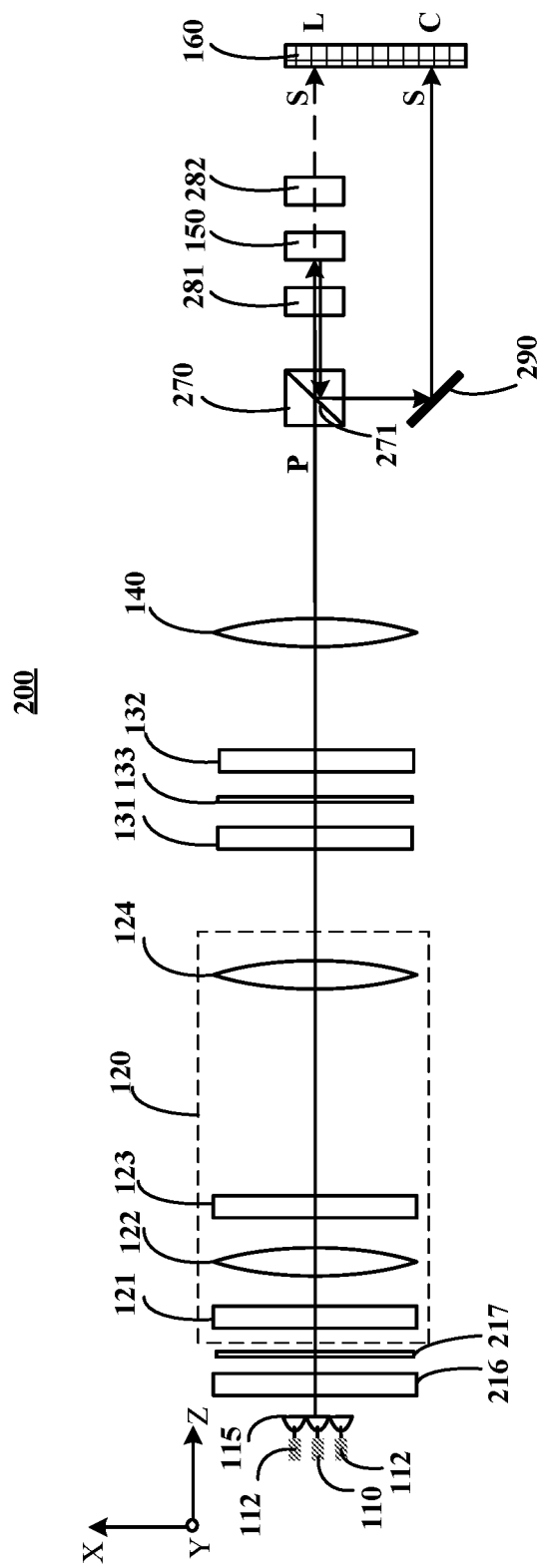
FIG. 6 is a schematic diagram of a structure of a wavelength selective switching apparatus in a port plane according to a second example embodiment of the present disclosure, showing a light path in a forward propagation direction.
Figure 7:
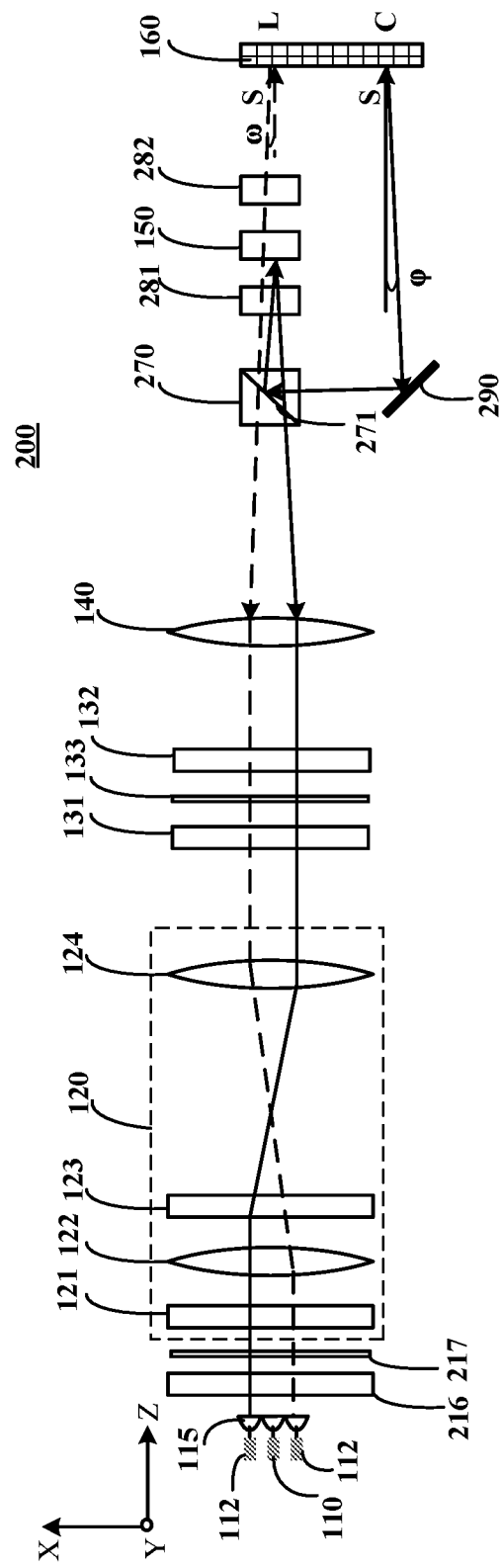
FIG. 7 is a schematic diagram of a structure of a wavelength selective switching apparatus in a port plane according to a second example embodiment of the present disclosure, showing a light path in a backward propagation direction.
Figure 8:
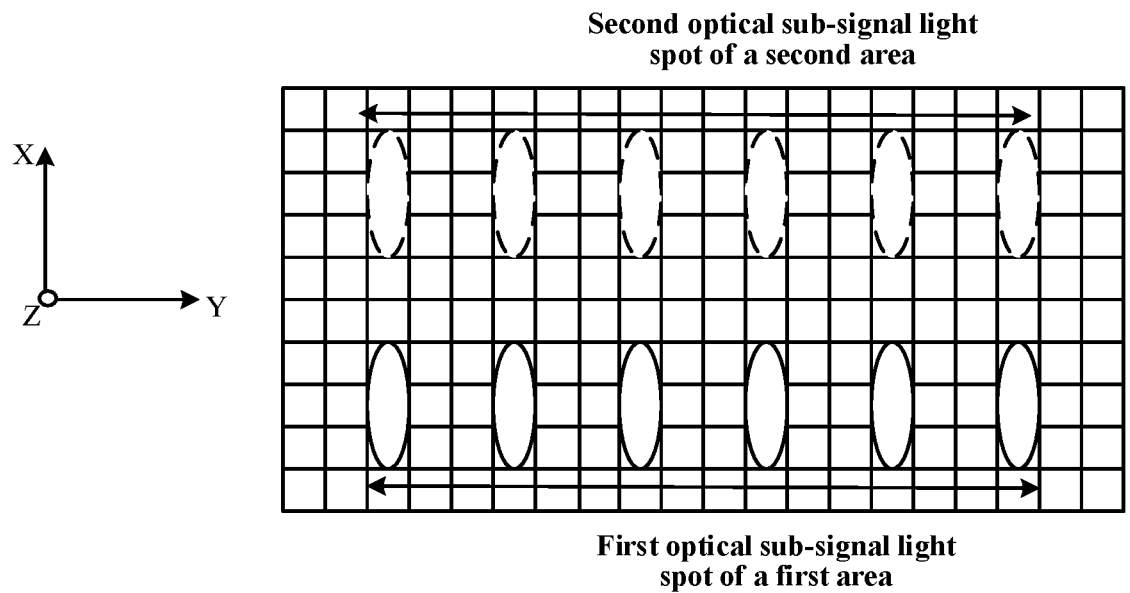
FIG. 8 is a schematic diagram of distribution of first-sub-band light spots and second-sub-band light spots on a surface of a light redirection device according to a second example embodiment of the present disclosure.

FIG. 5 to FIG. 8 describe implementations of a second example embodiment of a wavelength selective switching apparatus according to the present disclosure. FIG. 5 and FIG. 6 to FIG. 9 are respectively schematic diagrams of structures of wavelength selective switching apparatuses in a dispersion plane and a port plane. FIG. 8 is a schematic diagram of distribution of first-sub-band light spots and second-sub-band light spots on a surface of a light redirection device.

Figure 5:
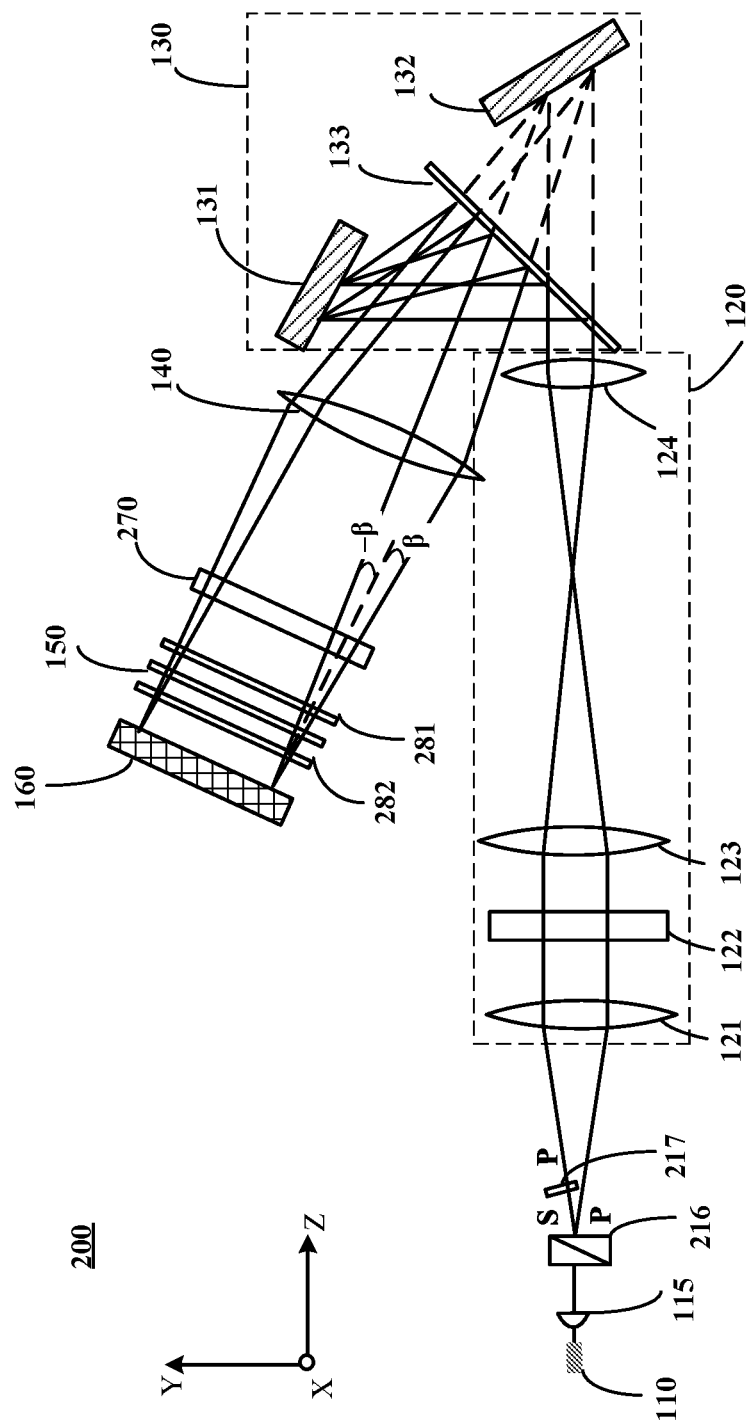
FIG. 5 is a schematic diagram of a structure of a wavelength selective switching apparatus in a dispersion plane according to a second example embodiment of the present disclosure.

As shown in FIG. 5 to FIG. 7, similar to the first example embodiment, a wavelength selective switching apparatus 200 in the second example embodiment may also include at least one input port 110, a plurality of output ports 112, a first lens assembly 120, a dispersion assembly 130, a second lens assembly 140, a first-band filter 150, and a light redirection device 160.

It should be noted herein that: in the present disclosure, same reference numerals are used across different embodiments to identify devices, indicating that structures and functions of these devices are the same or similar. Therefore, it should be understood that descriptions of a device of an embodiment in the present disclosure may be applicable to other embodiments using same or similar devices. To avoid repetition, functions and descriptions of same or similar components may be omitted in the following.

Different from the first example embodiment, the wavelength selective switching apparatus 200 in the second example embodiment may further include a first polarization beam splitter 216, a ½ wave plate 217, a second polarization beam splitter 270, a first wave plate 281, and a second wave plate 282. It will be understood that the second example embodiment may implement the wavelength selective switching apparatus 200 in a polarization manner.

The first polarization beam splitter 216 may be positioned between the at least one input port 110 and the dispersion assembly 130, and a function of the first polarization beam splitter 216 is to split a multi-band optical signal into an initial optical signal in a first polarization state (for example, S-polarized) and an initial optical signal in a second polarization state (for example, P-polarized) that are orthogonal to each other. The initial optical signal in the first polarization state and the initial optical signal in the second polarization state have an angle or a displacement difference in the dispersion direction. In embodiments having the first lens assembly 120, the first polarization beam splitter 216 may be, for example, positioned between the at least one input port 110 and the first lens assembly 120.

The ½ wave plate 217 may be positioned between the first polarization beam splitter 216 and the dispersion assembly 130, and a function of the ½ wave plate 217 is to convert the initial optical signal in the first polarization state (for example, S-polarized) into a converted optical signal in a second polarization state (for example, converted P-polarized). In embodiments having the first lens assembly 120, the ½ wave plate 217 may be, for example, positioned between the first polarization beam splitter 216 and the first lens assembly 120.

The second polarization beam splitter 270 may be positioned between the dispersion assembly 130 and the first-band filter 150, and a function of the second polarization beam splitter 270 is to split a first optical sub-signal (for example, a C-band beam) and a second optical sub-signal (for example, an L-band beam) in combination with the first-band filter 150.

The first wave plate 281 may be positioned between the first-band filter 150 and the second polarization beam splitter 270, and the second wave plate 282 may be positioned between the first-band filter 150 and the light redirection device 160. A function of the first wave plate 281 and the second wave plate 282 is to convert a polarized optical signal from one polarization state to another polarization state and split different band beams in combination with the first-band filter 150 and the second polarization beam splitter 270.

In some embodiments, it may be designed such that a sum of phase delays generated when the second optical sub-signal passes through the first wave plate 281 and the second wave plate 282 is approximately nπ, where n is an odd number. This can allow the second optical sub-signal to be converted from one polarization state to another polarization state after successively passing through both the first wave plate 281 and the second wave plate 282. In some other embodiments, it may be designed such that a sum of phase delays generated when the first optical sub-signal passes through the first wave plate 281 twice is also approximately nπ, where n is an odd number. This can allow a polarized optical signal to also be converted from one polarization state to another polarization state after passing through the first wave plate 281 twice. Then, the two sub-band (for example, C+L-band) beams on which polarization conversion and band splitting are performed may be incident to the light redirection device. In some particular embodiments, the first wave plate is a ¼ wave plate, and the second wave plate is also a ¼ wave plate.

The following describes an optical path condition of the wavelength selective switching apparatus in the dispersion plane according to the second example embodiment with reference to FIG. 5.

A multi-band optical signal (for example, a C+L signal beam) is input from the input port 110 and is collimated by the collimator mirror 115, and a beam obtained through collimation is split by the first polarization beam splitter 216 into two orthogonally polarized single-polarization signals, for example, an initial optical signal in a first polarization state (for example, S-polarized) and an initial optical signal in a second polarization state (for example, P-polarized). As an example, the first polarization beam splitter 216 may be a Wollaston prism, a coated PBS, or a polarizing crystal YVO4. It will be understood that the two split initial single-polarization signals may have an angle difference or a displacement difference in the dispersion direction.

The initial optical signal in the first polarization state (for example, S-polarized) may then be converted into the converted optical signal in the second polarization state (for example, converted P-polarized) by the ½ wave plate 217. In some embodiments, beam shaping may be performed by the first lens 121 and the third lens 123 in the first lens assembly 120 on two signal beams of same polarization, that is, the initial optical signal in the second polarization state and the converted optical signal in the second polarization state, to change a size of a light spot. Then, the two signal beams are converted by the fourth lens 124 into two parallel-propagating beams, and then, the two parallel-propagating beams are incident to the dispersion assembly 130. It may be understood that both the initial optical signal in the second polarization state and the converted optical signal in the second polarization state are multi-band beams in a second polarization state when incident to the dispersion assembly 130.

The dispersion assembly 130 may respectively disperse the initial optical signal in the second polarization state and the converted optical signal in the second polarization state into an initial sub-band signal in a second polarization state and a converted sub-band signal in a second polarization state. It will be understood that each of the initial sub-band signal in the second polarization state and the converted sub-band signal in the second polarization state includes a plurality of first optical sub-signals in a second polarization state (for example, a plurality of C-sub-band beams in a second polarization state) and a plurality of second optical sub-signals in a second polarization state (for example, a plurality of L-sub-band beams in a second polarization state). The initial sub-band signal in the second polarization state has an angle or displacement difference in the dispersion direction relative to the converted sub-band signal in the second polarization state.

In an embodiment in which the dispersion assembly 130 includes a first grating 131, a second grating 132, and a second-band filter 133, the second-band filter 133 may split a first-band (for example, C-band) beam and a second-band (for example, L-band) beam in the initial optical signal in the second polarization state and the converted optical signal in the second polarization state along different emission directions in a dispersion direction, for example, reflect the first-band (for example, C-band) beam and transmit the second-band (for example, L-band) beam, and respectively propagate the first-band beam and the second-band beam to the first grating 131 (for example, a C-band grating) and the second grating 132 (for example, an L-band grating). The grating may disperse a beam into a plurality of first optical sub-signals (for example, C-sub-band beams) and a plurality of second optical sub-signals (for example, L-sub-band beams).

The plurality of sub-band beams are emitted from a grating in the dispersion direction at different angles. In some embodiments, it may be designed such that the first optical sub-signals (for example, C-sub-band beams) and the second optical sub-bands (for example, L-sub-band beams) are propagated to a same position or close positions of the second-band filter 133 (for example, a C/L-band filter) in a wavelength direction or a dispersion direction. This helps reduce a size of the second-band filter 133 in the dispersion direction.

As an example only, for example, a start sub-band beam C_1 of a C band is 1524 nm, an end sub-band beam C_n of the C band is 1572 nm, a start sub-band beam L_1 of an L band is 1575 nm, and an end sub-band beam L_n of the L band is 1623 nm. Therefore, the C_1-sub-band beam and the L_1-sub-band beam may be propagated to a same position or close positions of the second-band filter 133 (for example, a C/L-band filter) in the wavelength direction or the dispersion direction, and the C_n-sub-band beam and the L_n-sub-band beam are propagated to a same position or close positions of the second-band filter 133 (for example, a C/L-band filter) in the wavelength direction or the dispersion direction.

The second-band filter 133 (for example, a C/L-band filter) may aggregate the corresponding first optical sub-signals (for example, C-sub-band) and the corresponding second optical sub-signals (for example, L-sub-band) along a same or close emission direction in the wavelength direction or the dispersion direction, and the first optical sub-signals and the second optical sub-signals are incident to the second polarization beam splitter 270. In some embodiments, the sub-band beams may optionally be incident to the second polarization beam splitter 270 through the second lens assembly 140 (for example, a single spherical lens). The second lens assembly 140 may help convert an angle difference between sub-band beams in the dispersion direction into a position difference in the dispersion direction.

In some embodiments, in the port/dispersion plane, an angle of incidence to the second polarization beam splitter 270 is 0 degree or near 0 degree (for example, within a range of ±10 degrees or +5 degrees), that is, vertical incidence or near vertical incidence is provided.

Particularly, in an embodiment in which the second polarization beam splitter 270 includes a polarization splitting film 271, it may be designed such that an angle of incidence to the polarization splitting film 271 of the second polarization beam splitter 270 in a forward/backward propagation direction in the port plane is 45 degrees or about 45 degrees (for example, within a range of 45±10 degrees or 45±5 degrees).

As shown in FIG. 6 and FIG. 7, the first optical sub-signal (for example, C-sub-band) may be incident to a first area on the light redirection device 160 through the second polarization beam splitter 270, the first wave plate 281, the first-band filter 150, the first wave plate 281 again, the second polarization beam splitter 270, and a reflector 290. The second optical sub-signal (for example, L-sub-band) may be incident to a second area on the light redirection device 160 through the second polarization beam splitter 270, the first wave plate 281, the first-band filter 150, and the second wave plate 282.

As described above, the initial sub-band signal in the second polarization state has an angle or displacement difference in the dispersion direction relative to the converted sub-band signal in the second polarization state. Therefore, in some embodiments, two beams of same polarization that have a same wavelength may be incident to the light redirection device 160 at different angles in the dispersion plane. In some further embodiments, the two beams of same polarization that have the same wavelength may be incident to a same position or close positions on the light redirection device 160 at symmetric angles (for example, a $\beta$ angle and $-\beta$ angle in FIG. 5) in the dispersion plane. As an example only, $\beta$ is usually less than 5 degrees.

In some other embodiments, the plurality of first sub-bands (for example, C bands) and the plurality of second sub-bands (for example, L bands) may be propagated to a same position or close positions of the light redirection device 160 in the dispersion direction in such a manner that the sub-bands correspond to each other. For example, the C_1-sub-band beam and the L_1-sub-band beam may be propagated to a same position or close positions of the light redirection device 160 in the dispersion direction, and the C_n-sub-band beam and the L_n-sub-band beam may be propagated to a same position or close positions of the light redirection device 160 in the wavelength direction. FIG. 8 is a schematic diagram of distribution of light spots of a first sub-band and a second sub-band on a surface of a light redirection device according to a second example embodiment of the present disclosure.

In some embodiments, the light redirection device 160, and the first grating 131 and the second grating 132 may be respectively located at a rear focus position and a front focus position of the second lens assembly 140. In some other embodiments, the first grating 131 and the second grating 132 may be located at a rear focus of the first lens assembly 120 or the fourth lens 124. In some other embodiments, a position of a front focus of the fourth lens 124 may coincide with that of a rear focus of the third lens 123. In some other embodiments, a position of a rear focus of the first lens 121 may coincide with that of a front focus of the third lens 123. In some other embodiments, a position of a front focus of the first lens 121 may coincide with that of a rear focus of the collimator mirror 115. In some other embodiments, the first lens 121 and the third lens 123 are cylindrical lenses, and have curvature only in the wavelength direction, and have no curvature in the port direction. In some other embodiments, the second lens 122 is a cylindrical lens, and has curvature only in the port direction, and has no curvature in the wavelength direction. In some other embodiments, the fourth lens 124 is a spherical lens and has curvature in both the wavelength direction and the port direction. In some other embodiments, the second lens assembly 140 is a single spherical lens and has curvature in both the wavelength direction and the port direction. In another embodiment, if the light redirection device 160 is a polarization sensitive device, for example, does not respond to an S-polarized beam, a ½ wave plate may be added in front of the light redirection device to change a polarization state of the beam to P polarization.

The light redirection device 160 may emit, in a redirected manner, the plurality of first optical sub-signals and the plurality of second optical sub-signals that are incident to the light redirection device 160 in a backward propagation direction, and then propagate the plurality of first optical sub-signals and the plurality of second optical sub-signals to the output port 112. In this case, the plurality of first optical sub-signals and the plurality of second optical sub-signals may be selectively switched to different ports in a port direction.

In some embodiments, to maximize device sharing, the light redirection device 160 may make the redirected beams of different sub-bands (that is, after the beams of different sub-bands are switched in the port direction) be propagated to the output port 112 through some or all of the second wave plate 282, the first-band filter 150, the first wave plate 281, the second polarization beam splitter 270, the second lens assembly 140, the dispersion assembly 130, the first lens assembly 120, and the collimator mirror 115 in the backward propagation direction.

As an example, in some embodiments, the light redirection device 161 may reflect the sub-band beam in the wavelength direction or the dispersion direction (that is, the sub-band beam is reflected in such a manner that an incidence angle is equal to a reflection angle). However, in other embodiments, it is also possible to switch the sub-band beam at another angle in the dispersion direction.

Likewise, herein, it is assumed that in the port plane, the plurality of first optical sub-signals (for example, C-band) and the plurality of second optical sub-signals (for example, L-band) are respectively incident to the first-band filter 150 at a first forward incidence angle and a second forward incidence angle in the forward propagation direction. The plurality of first optical sub-signals and the plurality of second optical sub-signals are respectively emitted from the first-band filter 150 at a first forward emission angle and a second forward emission angle in the forward propagation direction. In addition, it is assumed that in the port plane, the plurality of first optical sub-signals (for example, C-band) and the plurality of second optical sub-signals (for example, L-band) that are emitted from the first-band filter 150 are respectively incident to the light redirection device 160 at a first incidence angle and a second incidence angle in the forward propagation direction. The plurality of first optical sub-signals and the plurality of second optical sub-signals are respectively emitted from the light redirection device 160 at a first emission angle and a second emission angle in the backward propagation direction. In addition, it is assumed that in the port plane, the plurality of first optical sub-signals (for example, C-band) and the plurality of second optical sub-signals (for example, L-band) that are emitted from the light redirection device 160 are respectively incident to the first-band filter 150 at a first backward incidence angle and a second backward incidence angle in the backward propagation direction.

Particularly advantageously, both the first backward incidence angle and the second backward incidence angle are within a first predetermined angle range. As an example only, the first predetermined angle range may be a range of 0±20 degrees, 0±10 degrees, 0±5 degrees, or 0±3 degrees.

In some embodiments, the first forward incidence angle, the second forward incidence angle, the first forward emission angle, or the second forward emission angle may be within a second predetermined angle range. As an example only, the second predetermined angle range is, for example, a range of −10 degrees to +10 degrees, a range of −5 degrees to +5 degrees, in particular, a range of −3 degrees to +3 degrees, or more particularly 0 degree. This means that in the port plane, the plurality of first optical sub-signals and the plurality of second optical sub-signals may be incident to and emitted from the first-band filter 150 in a nearly vertical or completely vertical manner in the forward propagation direction.

Particularly advantageously, in some embodiments, the first incidence angle or the second incidence angle of incidence to the light redirection device may alternatively be, for example, within a range of −5 degrees to +5 degrees, in particular, a range of −3 degrees to +3 degrees, or more particularly 0 degree. This means that, in the port plane, the plurality of first optical sub-signals and the plurality of second optical sub-signals may be incident to the light redirection device 160 in a nearly vertical or completely vertical manner in the forward propagation direction.

The light redirection device 160 may make the plurality of first optical sub-signals and the plurality of second optical sub-signals that are incident to the light redirection device 160 be respectively emitted at the first emission angle and the second emission angle in a redirected manner. Particularly advantageously, in some embodiments, a range of the first emission angle and the second emission angle may be a range of −20 degrees to +20 degrees, a range of −10 degrees to +10 degrees, or a range of −5 degrees to +5 degrees, in particular, a range of −3 degrees to +3 degrees. In a further embodiment, the first emission angle may be approximately equal to or equal to the first backward incidence angle, and the second emission angle may be equal to the second backward incidence angle.

It will be understood that the first forward incidence angle, the second forward incidence angle, the first forward emission angle, the second forward emission angle, the first backward incidence angle, or the second backward incidence angle in the port plane are designed by using the angle range designed above. Change of an angle of incidence to the first-band filter when the light redirection device 160 performs signal switching in the port direction may be advantageously made to be greatly reduced. This helps alleviate a filter impairment.

As an example, the first-band filter 150 may combine the plurality of redirected first optical sub-signals (for example, C-sub-band beams) and the plurality of redirected second optical sub-signals (for example, L-sub-band beams) that are incident to the first-band filter 150 into a plurality of sub-band beams (for example, C+L-sub-band beam) and then backward propagate the plurality of sub-band beams to the dispersion assembly 130 through the second lens assembly 140. In some embodiments, if two beams of same polarization that have a same wavelength in the dispersion direction are incident to a same position of the light redirection device 160 at symmetrical angles in the dispersion direction, the switched first polarized beam may be backward propagated to the output port 112 along a forward propagation optical path of the second polarized beam, and the second polarized beam may be backward propagated to the output port 112 along a forward propagation optical path of the first polarized beam.

It should be noted that in either the forward propagation direction or the backward propagation direction, in some embodiments, corresponding bands in the plurality of first optical sub-signals (for example, C-sub-band beams) and the plurality of second optical sub-signals (for example, L-sub-band beams) may be made to be propagated to a same position or close positions of the first-band filter 150 in the wavelength direction or the dispersion direction. As an example only, the C_1-sub-band beam and the L_1-sub-band beam may be forward or backward propagated to a same position or close positions of the first-band filter 150 in the wavelength direction or the dispersion direction, and the C_n-sub-band beam and the L_n-sub-band beam may be forward or backward propagated to a same position or close positions of the first-band filter 150 in the wavelength direction or the dispersion direction. In this way, sizes of the first-band filter 150 and the WSS module in the wavelength direction can be greatly reduced.

However, it will be understood that it is also possible that the plurality of corresponding first optical sub-signals (for example, C-sub-band beams) and the plurality of corresponding second optical sub-signals (for example, L-sub-band beams) are made to be propagated, in the forward or backward propagation direction, to different positions of the first-band filter 150 in the wavelength direction. In this case, for example, the first-band optical signal and the second-band optical signal may be input to the WSS by using one input port each.

The following describes an optical path condition of the wavelength selective switching apparatus in the port plane according to the second example embodiment of the present disclosure with reference to FIG. 6 and FIG. 7. FIG. 6 shows a forward propagation optical path from a perspective of the port plane, and FIG. 7 shows a backward propagation optical path from the perspective of the port plane.

First, from the perspective of the forward propagation optical path, it can be seen from FIG. 6 that a multi-band beam (for example, a C+L-band beam) in the port plane may be input from the input port 110. A beam obtained through collimation by the collimator mirror 115 may be incident to the second polarization beam splitter 270 through the first polarization beam splitter 216, the ½ wave plate 217, the second lens 122, the fourth lens 124, the dispersion assembly 130, and the second lens assembly 140, then incident to the first wave plate 281, the first-band filter 150, the second wave plate 282, and finally incident to the light redirection device 160.

In some embodiments, in the port plane, an angle of incidence to the second polarization beam splitter 270 in the forward/backward propagation direction may be 0 degree or near 0 degree (for example, within a range of 0±10 degrees or 0±5 degrees), that is, vertical incidence or near vertical incidence is provided. Particularly, in an embodiment in which the second polarization beam splitter 270 includes a polarization splitting film 271, an angle of incidence to the polarization splitting film of the second polarization beam splitter 270 in the port plane may be 45 degrees or about 45 degrees (for example, within a range of 45±10 degrees or 45±5 degrees).

Two same beams in a second polarization state (for example, an initial sub-band signal in a second polarization state and a converted sub-band signal in a second polarization state that are P-polarized) may transmit the second polarization beam splitter 270, and then be propagated to the first wave plate 281, the first-band filter 150, the second wave plate 282, and the light redirection device 160.

For ease of discussion, it is assumed below that both the first wave plate 281 and the second wave plate 282 are ¼ wave plates. It should be understood that implementations of the first wave plate 281 and the second wave plate 282 in this application include but are not limited to a ¼ wave plate. Herein, the first wave plate 281 serving as a ¼ wave plate may convert two linearly polarized (for example, P-polarized) beams in a second polarization state into circularly polarized beams, and then the two circularly polarized beams are propagated to the first-band filter 150.

In some embodiments, an angle (that is, a first forward incidence angle and a second forward incidence angle) of incidence (that is, first incidence) to the first-band filter 150 in the forward propagation direction in the port plane may be within a second predetermined angle range, such as 0 degree or near 0 degree (for example within a range of 10 degrees, ±5 degrees, or ±3 degrees), that is, vertical incidence or near vertical incidence may be provided. In some embodiments, an angle (that is, a third forward incidence angle and a fourth forward incidence angle) of incidence to the first-band filter 150 in the forward propagation direction in the dispersion plane may be within a fourth predetermined angle range. The fourth predetermined angle range may be the same as the second predetermined angle range, such as 0 degree or near 0 degree (for example within a range of ±10 degrees, ±5 degrees, or ±3 degrees), that is, vertical incidence or near vertical incidence may be provided.

The first-band filter 150 may change a propagation direction of the first-band (for example, C-band) beam and the second-band (for example, L-band) beam. For example, the first-band (for example, C-band) beam may be made to be reflected by the first-band filter 150 and propagated to the first wave plate 281 (a solid line) serving as a ¼ wave plate, and the second-band (for example, L-band) beam may be made to be transmitted through the first-band filter 150 and propagated to the second wave plate 282 (a dotted line) serving as a ¼ wave plate. Because of reflection, the first-band (for example, C-band) beam is again transmitted through the first wave plate 281 serving as a ¼ wave plate. The first wave plate 281 converts the circularly polarized first-band beam into a first linearly polarized (for example, S-polarized) beam and then propagates the first linearly polarized beam to the second polarization beam splitter 270. An angle at which the first-band (for example, C-band) beam is incident to the polarization splitting film 271 in the second polarization splitter 270 may be 45 degrees or about 45 degrees (for example, within a range of 45±10 degrees or 45±5 degrees). The polarization splitting film 271 may change a propagation direction of the first-band (for example, C-band) beam, for example, reflect the first-band (for example, C-band) beam, and then propagate the first-band beam to a reflector 290. The reflector 290 propagates the first-band (for example, C-band) beam to a first area of the light redirection device 160. The second-band (for example, L-band) beam transmitted through the first-band filter 150 may be transmitted through the second wave plate 282 serving as a ¼ wave plate. The second wave plate 282 converts the circularly polarized second-band (for example, L-band) beam into a first linearly polarized (S-polarized) beam, and then propagates the first linearly polarized beam to a second area of the light redirection device 160.

In some embodiments, in the port plane, an angle at which beams of the first-band (for example, C-band) optical signal and the second-band (for example, L-band) optical signal are incident to the light redirection device 160 is 0 degree or about 0 degree (for example, within a range of 10 degrees or ±5 degrees).

In some embodiments, the light redirection device 160 may be at a rear focus position of the second lens assembly 140. In some other embodiments, a position of a rear focus of the first lens assembly 120 or the fourth lens 124 may coincide with that of a front focus of the second lens assembly 140. In some other embodiments, a position of a front focus of the fourth lens 124 may coincide with that of a rear focus of the second lens 122. In some other embodiments, a position of a front focus of the second lens 122 may coincide with that of a rear focus of the collimator mirror 115.

In some embodiments, if the light redirection device 160 is a polarization sensitive device, for example, does not respond to an S-polarized beam, a ½ wave plate may be added in front of the light redirection device 160 to change a polarization state of the beam to P polarization.

FIG. 8 is a schematic diagram of distribution of first-sub-band light spots and second-sub-band light spots on a light redirection device. As shown in FIG. 8, the first-sub-band (for example, C-sub-band) beam light spots are distributed in a first area, and the second-sub-band (for example, L-band) beam light spots are distributed in a second area. In the second example embodiment, the first-sub-band (for example, C-sub-band) beam light spots and the second-sub-band (for example, L-band) beam light spots may be aligned at a position Y of the light redirection device 160 in the dispersion direction, and may be split at a position X in the port direction.

FIG. 7 shows a backward propagation optical path. From the perspective of the backward propagation optical path, in the port plane, the light redirection device 160 changes a propagation direction of the first-band beam (for example, a C-band beam), to switch the signal in the port direction. In the port plane, it is assumed that an angle at which the first-band beam (for example, a C-band beam) is emitted from the light redirection device 160 is $\phi$. Then, a first linearly polarized (for example, S-polarized) first-band beam (for example, a C-band beam) is incident to the second polarization beam splitter 270 through the reflector 190, and is reflected by the polarization splitting film 271 of the second polarization beam splitter 270 to the first wave plate 281 serving as a ¼ wave plate. After the first-band beam (for example, a C-band beam) is transmitted through the first wave plate 281 serving as a ¼ wave plate, a polarization state of the first-band beam is converted into circular polarization, and then the first-band beam is propagated to the first-band filter 150. In this case, an angle at which the first-band beam (for example, a C-band beam) is incident to the first-band filter 150 is ϕ or about ϕ (for example within a range of ϕ±10 degrees or ϕ±5 degrees).

Then, the first-band filter 150 reflects the first-band beam (for example, a C-band beam) to the first wave plate 281 serving as a ¼ wave plate. After the first-band beam (for example, a C-band beam) is again transmitted through the first wave plate 281 serving as a ¼ wave plate, a polarization state of the first-band beam is converted into second linear polarization (for example, P polarization), and then the first-band beam is propagated to the second polarization beam splitter 270. In this case, the second linearly polarized (for example, P-polarized) C beam may be transmitted through the second polarization beam splitter 270 and through the second lens assembly 140, the dispersion assembly 130, and the first lens assembly 120 to the output port 112. In particular, the second lens 122 in the first lens assembly 120 may convert the first-band beams (for example, C-band beams) having different port direction switching angles into beams having different port direction displacements. The first-band beams (for example, C-band beams) having different port direction displacements may be incident to different output ports 112 through the collimator mirror 115.

In the port plane, the light redirection device 160 changes a propagation direction of the second-band beam (for example, an L-band beam), to switch the signal. It may be assumed that an angle at which the second-band beam (for example, an L-band beam) is emitted from the light redirection device 160 is ω. Then, the first linearly polarized (for example, S-polarized) second-band beam (for example, an L-band beam) is incident to the second wave plate 282 serving as a ¼ wave plate. After the second-band beam (for example, an L-band beam) is transmitted through the second wave plate 282 serving as a ¼ wave plate, a polarization state of the second-band beam is converted into circular polarization, and then the second-band beam is propagated to the first-band filter 150. In this case, an angle at which the second-band beam (for example, an L-band beam) is incident to the first-band filter 150 is ω or about ω (for example within a range of ψ±10 degrees or ω±5 degrees).

Then, after the second-band beam (for example, an L-band beam) is transmitted through the first-band filter 150, the second-band beam is propagated to the first wave plate 281 serving as a ¼ wave plate. After the second-band beam (for example, an L-band beam) is further transmitted through the first wave plate 281 serving as a ¼ wave plate, a polarization state of the second-band beam is converted into second linear polarization (for example, P polarization), and then the second-band beam is propagated to the second polarization beam splitter 270. Subsequently, a second linearly polarized (P-polarized) second-band beam (for example, an L-band beam) is transmitted through the second polarization beam splitter 270 and through the second lens assembly 240, the dispersion assembly 130, and the first lens assembly 120 to the output port 112. In particular, the second lens 122 in the first lens assembly 120 may convert the second-band beams (for example, L-band beams) having different port direction switching angles into beams having different port direction displacements. The second-band beams (for example, L-band beams) having different port direction displacements may be incident to different output ports through the collimator mirror 115.

It can be seen that in the port plane, after the first-band beam and the second-band beam are switched by the light redirection device, an angle which the first-band beam (for example, a C-band beam) and the second-band beam (for example, an L-band beam) are incident again (that is, incident in the backward propagation direction) to the first-band filter 150 may be equal to an angle at which the light redirection device 160 switches a signal (for example, the angle ϕ and the angle ω in FIG. 7) or about the angle, for example, within a range of −3 degrees to +3 degrees. It will be understood that, compared with a case in which a large backward incidence angle is designed in the port plane, when a same signal switching angle of the light redirection device is applied, in this embodiment of the present disclosure, after the light redirection device switches the signal, change of an angle at which the beam is incident to the first-band filter in the port plane can be greatly reduced. According to the formula (2), this can greatly reduce the filter spectral shift of the first-band filter. Through experiments and calculation, the filter spectrum shift according to this embodiment of the present disclosure can be less than +/−1 nm. This greatly alleviates a filter impairment of a signal.

Third Example Embodiment

Figure 9:
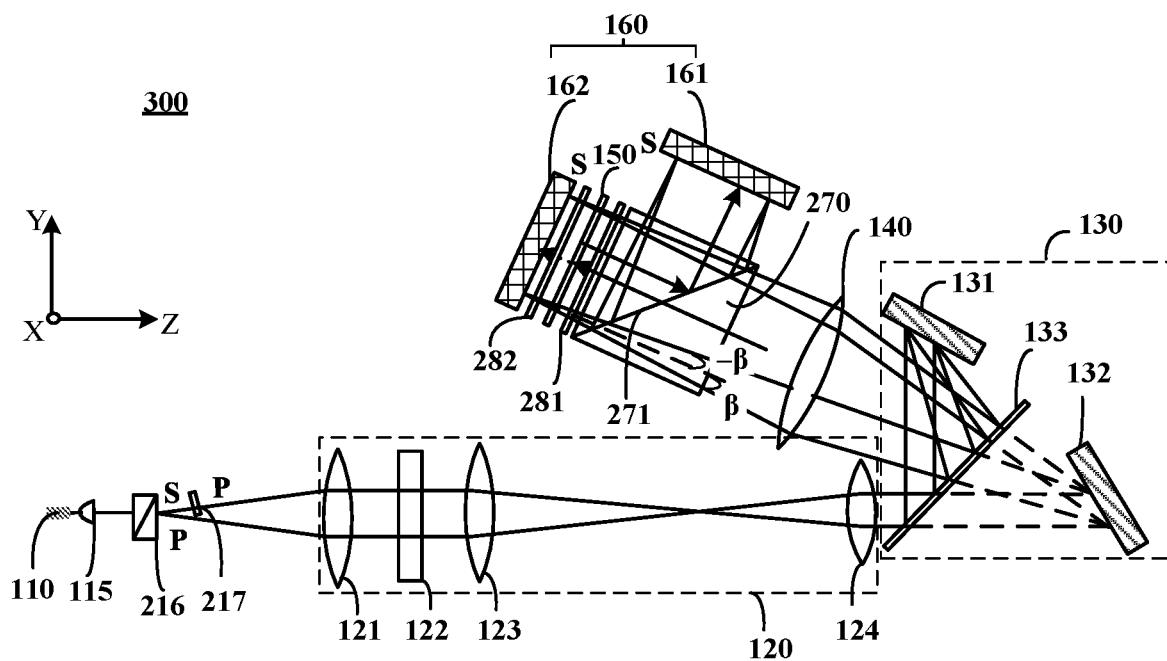
FIG. 9 is a schematic diagram of a structure of a wavelength selective switching apparatus in a dispersion plane according to a third example embodiment of the present disclosure.
Figure 10:
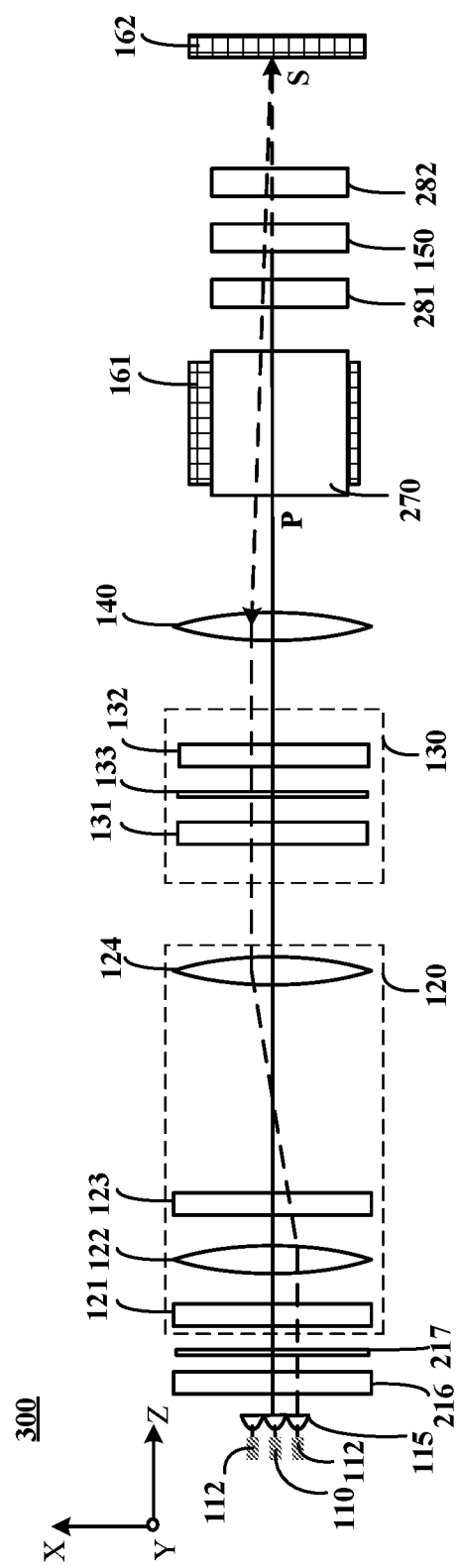
FIG. 10 is a schematic diagram of a structure of a wavelength selective switching apparatus in a port plane according to a third example embodiment of the present disclosure.
Figure 11A:
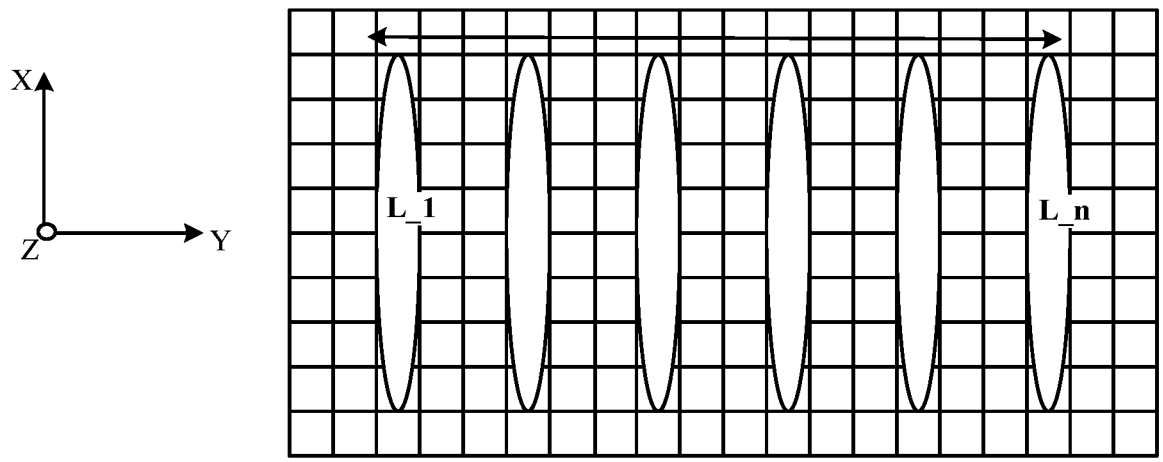
FIG. 11a is a schematic diagram of distribution of light spots of a second sub-band on a surface of a light redirection device according to a third example embodiment of the present disclosure.
Figure 11B:
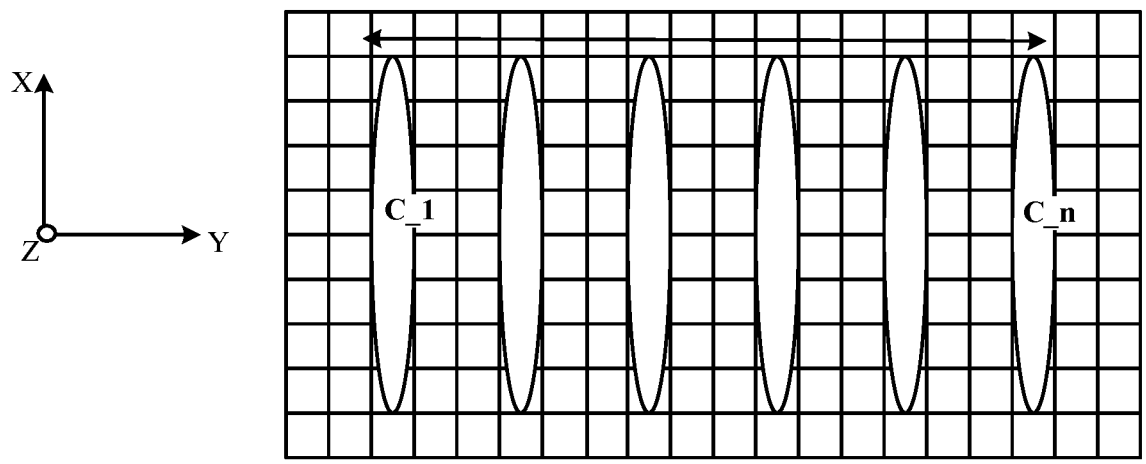
FIG. 11b is a schematic diagram of distribution of light spots of a first sub-band on a surface of a light redirection device according to a third example embodiment of the present disclosure.

FIG. 9 to FIG. 11b show implementations of a third example embodiment of a wavelength selective switching apparatus according to the present disclosure. FIG. 9 and FIG. 10 are respectively schematic diagrams of structures of wavelength selective switching apparatuses in a dispersion plane and a port plane. FIG. 11a and FIG. 11b are respectively schematic diagrams of distribution of light spots of a second sub-band and a first sub-band on a surface of a light redirection device.

The third example embodiment is similar to the second example embodiment, but a core difference is that in the third example embodiment, a polarization beam splitter 270 splits a polarized signal in a dispersion plane rather than in a port plane, while in the second example embodiment, a polarization beam splitter 270 splits a polarized signal in a port plane rather than in a dispersion plane. In addition, in the third example embodiment, a light redirection device 160 includes a first light redirection device 161 and a second light redirection device 162, rather than including a single light redirection device. An optical path implementation of the third example embodiment is briefly described below.

A multi-band optical signal (for example, a C+L signal beam) is input from the input port 110 and is collimated by the collimator mirror 115, and a beam obtained through collimation is split by the first polarization beam splitter 216 into two orthogonally polarized single-polarization signals, for example, an initial optical signal in a first polarization state (for example, S-polarized) and an initial optical signal in a second polarization state (for example, P-polarized). As an example, the first polarization beam splitter 216 may be a Wollaston prism, a coated PBS, or a polarizing crystal YVO4. It will be understood that the two split initial single-polarization signals may have an angle difference or a displacement difference in the dispersion direction.

The initial optical signal in the first polarization state (for example, S-polarized) may then be converted into the converted optical signal in the second polarization state (for example, converted P-polarized) by the ½ wave plate 217. In some embodiments, beam shaping may be performed by the first lens 121 and the third lens 123 in the first lens assembly 120 on two signal beams of same polarization, that is, the initial optical signal in the second polarization state and the converted optical signal in the second polarization state, to change a size of a light spot. Then, the two signal beams are converted by the fourth lens 124 into two parallel-propagating beams, and then, the two parallel-propagating beams are incident to the dispersion assembly 130. It may be understood that both the initial optical signal in the second polarization state and the converted optical signal in the second polarization state are multi-band beams in a second polarization state when incident to the dispersion assembly 130.

The dispersion assembly 130 may respectively disperse the initial optical signal in the second polarization state and the converted optical signal in the second polarization state into an initial sub-band signal in a second polarization state and a converted sub-band signal in a second polarization state. It will be understood that each of the initial sub-band signal in the second polarization state and the converted sub-band signal in the second polarization state includes a plurality of first optical sub-signals in a second polarization state (for example, a plurality of C-sub-band beams in a second polarization state) and a plurality of second optical sub-signals in a second polarization state (for example, a plurality of L-sub-band beams in a second polarization state). The initial sub-band signal in the second polarization state has an angle or displacement difference in the dispersion direction relative to the converted sub-band signal in the second polarization state.

In an embodiment in which the dispersion assembly 130 includes a first grating 131, a second grating 132, and a second-band filter 133, the second-band filter 133 may split a first-band (for example, C-band) beam and a second-band (for example, L-band) beam in the initial optical signal in the second polarization state and the converted optical signal in the second polarization state along different emission directions in a dispersion direction, for example, reflect the first-band (for example, C-band) beam and transmit the second-band (for example, L-band) beam, and respectively propagate the first-band beam and the second-band beam to the first grating 131 (for example, a C-band grating) and the second grating 132 (for example, an L-band grating). The grating may disperse a beam into a plurality of first optical sub-signals (for example, C-sub-band beams) and a plurality of second optical sub-signals (for example, L-sub-band beams).

The plurality of sub-band beams are emitted from a grating in the dispersion direction at different angles. In some embodiments, it may be designed such that the first optical sub-signals (for example, C-sub-band beams) and the second optical sub-signals (for example, L-sub-band beams) are propagated to a same position or close positions of the second-band filter 133 (for example, a C/L-band filter) in a wavelength direction or a dispersion direction. This can help reduce a size of the second-band filter 133 in the dispersion direction.

As an example only, for example, a start sub-band beam C_1 of a C band is 1524 nm, an end sub-band beam C_n of the C band is 1572 nm, a start sub-band beam L_1 of an L band is 1575 nm, and an end sub-band beam L_n of the L band is 1623 nm. Therefore, the C_1 sub-band beam and the L_1 sub-band beam may be propagated to a same position or close positions of the second-band filter 133 (for example, a C/L-band filter) in the wavelength direction or the dispersion direction, and the C_n-sub-band beam and the L_n-sub-band beam may be propagated to a same position or close positions of the second-band filter 133 (for example, a C/L-band filter) in the wavelength direction or the dispersion direction.

In some embodiments, the second-band filter 133 (for example, a C/L-band filter) aggregates the corresponding first optical sub-signals (for example, C-sub-band) and the corresponding second optical sub-signals (for example, L-sub-band) along a same or close emission direction in the wavelength direction or the dispersion direction, and the first optical sub-signals and the second optical sub-signals are incident to the second polarization beam splitter 270. In some embodiments, the sub-band beams may optionally be incident to the second polarization beam splitter 270 through the second lens assembly 140 (for example, a single spherical lens). The second lens assembly 140 may help convert an angle difference between sub-band beams in the dispersion direction into a position difference in the dispersion direction.

In some embodiments, in the dispersion plane, an angle of incidence to the second polarization beam splitter 270 in the forward/backward propagation direction may be 0 degree or near 0 degree (for example, within a range of 10 degrees or 5 degrees), that is, vertical incidence or near vertical incidence is provided.

Particularly, in an embodiment in which the second polarization beam splitter 270 includes a polarization splitting film 271, it may be designed such that an angle of incidence to the polarization splitting film 271 of the second polarization beam splitter 270 in a forward/backward propagation direction in the dispersion plane is 45 degrees or about 45 degrees (for example, within a range of 45±10 degrees or 45±5 degrees).

As shown in FIG. 9, the first optical sub-signal (for example, C-sub-band) may be incident to the light redirection device 161 through the second polarization beam splitter 270, the first wave plate 281, the first-band filter 150, the first wave plate 281 again, and the polarization splitting film 271 of the second polarization beam splitter 270, as shown in a solid line with an arrow in FIG. 9. The second optical sub-signal (for example, L-sub-band) may be incident to the light redirection device 162 through the second polarization beam splitter 270, the first wave plate 281, the first-band filter 150, and the second wave plate 282, as a dotted line with an arrow in FIG. 9.

As described above, the initial sub-band signal in the second polarization state has an angle or displacement difference in the dispersion direction relative to the converted sub-band signal in the second polarization state. Therefore, in some embodiments, two beams of same polarization that have a same wavelength may be incident to the light redirection device 161 or 162 at different angles in the dispersion plane. In some further embodiments, the two beams of same polarization that have the same wavelength may be incident to a same position or close positions on the light redirection device 161 or 162 at symmetric angles (for example, a β angle and −β angle in FIG. 9) in the dispersion plane. As an example only, R is usually less than 5 degrees.

As an example only, both the first wave plate 281 and the second wave plate 282 may be ¼ wave plates. In this case, when two linearly polarized (for example, P-polarized) beams in a same second polarization state are transmitted through the second polarization beam splitter 270 and propagated to the first wave plate 281 serving as a ¼ wave plate, the first wave plate 281 converts the two same linearly polarized beams into circularly polarized beams, and then the two circularly polarized beams are then propagated to the first-band filter 150.

In some embodiments, an angle (that is, a first forward incidence angle and a second forward incidence angle) of incidence (that is, first incidence) to the first-band filter 150 in the forward propagation direction in the port plane may be within a second predetermined angle range, such as 0 degree or near 0 degree (for example within a range of ±10 degrees, ±5 degrees, or ±3 degrees), that is, vertical incidence or near vertical incidence may be provided. In some embodiments, an angle (that is, a third forward incidence angle and a fourth forward incidence angle) of incidence to the first-band filter 150 in the forward propagation direction in the dispersion plane may be within a fourth predetermined angle range. The fourth predetermined angle range may be the same as the second predetermined angle range, such as 0 degree or near 0 degree (for example within a range of ±10 degrees, ±5 degrees, or +3 degrees), that is, vertical incidence or near vertical incidence may also be provided.

The first-band filter 150 changes a propagation direction of a plurality of first sub-bands (for example, C bands) and a plurality of second sub-bands (for example, L bands), for example, makes the plurality of first sub-bands (for example, C bands) be reflected by the first-band filter 150 and propagated to the first wave plate 281 (a solid line with an arrow) serving as a ¼ wave plate, and makes the plurality of second sub-bands (for example, L bands) be transmitted through the first-band filter 150 and propagated to the second wave plate 282 (a dashed line with an arrow) serving as a ¼ wave plate.

The plurality of first sub-bands (for example, C bands) are again transmitted through the first wave plate 281 serving as a ¼ wave plate. The first wave plate 281 converts the plurality of circularly polarized first sub-bands (for example, C bands) into a first linearly polarized (for example, S-polarized) beam and then propagates the first linearly polarized beam to the polarization splitting film 271 of the second polarization beam splitter 270.

In an embodiment in which the second polarization beam splitter 270 includes the polarization splitting film 271, an angle at which the plurality of first optical sub-signals or sub-bands (for example, C bands) are incident to the polarization splitting film 271 in the polarization beam splitter 270 may be 45 degrees or about 45 degrees (for example, within a range of 45±10 degrees or 45±5 degrees). The polarization splitting film 271 may change the propagation direction of the plurality of first sub-bands (for example, C bands), for example, reflect a C beam and propagate the C beam to the first light redirection device 161. The plurality of second optical sub-signals or second sub-bands (for example, L bands) of the first-band filter 150 are transmitted through the second wave plate 282 serving as a ¼ wave plate. The second wave plate 282 converts the plurality of circularly polarized second sub-bands (for example, L bands) into a first linearly polarized (S-polarized) beam, and then propagates the first linearly polarized beam to the second light redirection device 162.

In some embodiments, the light redirection devices 161 and 162, and the grating in the dispersion assembly 130 may be respectively located at a rear focus position and a front focus position of the second lens assembly 140. In some other embodiments, the grating may be located at a rear focus of the first lens assembly 120 or the fourth lens 124. In some other embodiments, a position of a front focus of the fourth lens 124 may coincide with that of a rear focus of the third lens 123. In some other embodiments, a position of a rear focus of the first lens 121 may coincide with that of a front focus of the third lens 123. In some other embodiments, a position of a front focus of the first lens 121 may coincide with that of a rear focus of the collimator mirror 115. In some other embodiments, the first lens 121 and the third lens 123 are cylindrical lenses, and have curvature only in the wavelength direction, and have no curvature in the port direction. In some other embodiments, the second lens 122 is a cylindrical lens, and has curvature only in the port direction, and has no curvature in the wavelength direction. In some other embodiments, the fourth lens 124 is a spherical lens and has curvature in both the wavelength direction and the port direction. In some other embodiments, the second lens assembly 140 is a single spherical lens and has curvature in both the wavelength direction and the port direction. In another embodiment, if the light redirection device is a polarization sensitive device, for example, does not respond to an S-polarized beam, a ½ wave plate may be added in front of the light redirection device to change a polarization state of the beam to P polarization.

The light redirection device 160 may emit, in a redirected manner, the plurality of first optical sub-signals and the plurality of second optical sub-signals that are incident to the light redirection device 160 in a backward propagation direction (in this case, the plurality of first optical sub-signals and the plurality of second optical sub-signals are switched to a port direction), and then propagate the plurality of first optical sub-signals and the plurality of second optical sub-signals to the output port 112.

In some embodiments, to maximize device sharing, the light redirection device 160 may make the redirected beams of different sub-bands (that is, after the beams of different sub-bands are switched in the port direction) be propagated to the output port 112 through some or all components of the second wave plate 282, the first-band filter 150, the first wave plate 281, the second polarization beam splitter 270, the second lens assembly 140, the dispersion assembly 130, the first lens assembly 120, and the collimator mirror 115 in the backward propagation direction.

As an example, in some embodiments, the light redirection device 161 may reflect the sub-band beam in the wavelength direction or the dispersion direction (that is, the sub-band beam is reflected in such a manner that an incidence angle is equal to a reflection angle). However, in other embodiments, it is also possible to switch the sub-band beam at another angle in the dispersion direction.

Likewise, herein, it is assumed that in the port plane, the plurality of first optical sub-signals (for example, C-band) and the plurality of second optical sub-signals (for example, L-band) are respectively incident to the first-band filter 150 at a first forward incidence angle and a second forward incidence angle in the forward propagation direction. The plurality of first optical sub-signals and the plurality of second optical sub-signals are respectively emitted from the first-band filter 150 at a first forward emission angle and a second forward emission angle in the forward propagation direction. In addition, it is assumed that in the port plane, the plurality of first optical sub-signals (for example, C-band) and the plurality of second optical sub-signals (for example, L-band) that are emitted from the first-band filter 150 are respectively incident to the light redirection device 160 at a first incidence angle and a second incidence angle in the forward propagation direction. The plurality of first optical sub-signals and the plurality of second optical sub-signals are respectively emitted from the light redirection device 160 at a first emission angle and a second emission angle in the backward propagation direction. In addition, it is assumed that in the port plane, the plurality of first optical sub-signals (for example, C-band) and the plurality of second optical sub-signals (for example, L-band) that are emitted from the light redirection device 160 are respectively incident to the first-band filter 150 at a first backward incidence angle and a second backward incidence angle in the backward propagation direction.

Particularly advantageously, both the first backward incidence angle and the second backward incidence angle are within a first predetermined angle range. As an example only, the first predetermined angle range may be a range of 0±20 degrees, 0±10 degrees, 0±5 degrees, or 0±3 degrees.

In some embodiments, the first forward incidence angle, the second forward incidence angle, the first forward emission angle, or the second forward emission angle may be within a second predetermined angle range. As an example only, the second predetermined angle range is, for example, a range of −10 degrees to +10 degrees, a range of −5 degrees to +5 degrees, in particular, a range of −3 degrees to +3 degrees, or more particularly 0 degree. This means that in the port plane, the plurality of first optical sub-signals and the plurality of second optical sub-signals may be incident to and emitted from the first-band filter 150 in a nearly vertical or completely vertical manner in the forward propagation direction.

Particularly advantageously, in some embodiments, the first incidence angle or the second incidence angle of incidence to the light redirection device may alternatively be, for example, within a range of −5 degrees to +5 degrees, in particular, a range of −3 degrees to +3 degrees, or more particularly 0 degree. This means that, in the port plane, the plurality of first optical sub-signals and the plurality of second optical sub-signals may be incident to the light redirection device 160 in a nearly vertical or completely vertical manner in the forward propagation direction.

The light redirection device 160 may make the plurality of first optical sub-signals and the plurality of second optical sub-signals that are incident to the light redirection device 160 be respectively emitted at the first emission angle and the second emission angle in a redirected manner. Particularly advantageously, in some embodiments, a range of the first emission angle and the second emission angle may be a range of −20 degrees to +20 degrees, a range of −10 degrees to +10 degrees, or a range of −5 degrees to +5 degrees, in particular, a range of −3 degrees to +3 degrees. In a further embodiment, the first emission angle may be approximately equal to or equal to the first backward incidence angle, and the second emission angle may be equal to the second backward incidence angle.

It will be understood that the first forward incidence angle, the second forward incidence angle, the first forward emission angle, the second forward emission angle, the first backward incidence angle, or the second backward incidence angle in the port plane are designed by using the angle range designed above. Change of an angle of incidence to the first-band filter when the light redirection device 160 performs signal switching in the port direction may be advantageously made to be greatly reduced. This helps alleviate a filter impairment.

As an example, the first-band filter 150 may combine the plurality of redirected first optical sub-signals (for example, C-sub-band beams) and the plurality of redirected second optical sub-signals (for example, L-sub-band beams) that are incident to the first-band filter 150 into a plurality of sub-band beams (for example, C+L-sub-band beam) and then backward propagate the plurality of sub-band beams to the dispersion assembly 130 through the second lens assembly 140. In some embodiments, if two beams of same polarization that have a same wavelength in the dispersion direction are incident to a same position of the light redirection device 160 at symmetrical angles in the dispersion direction, the switched first polarized beam may be backward propagated to the output port 112 along a forward propagation optical path of the second polarized beam, and the second polarized beam may be backward propagated to the output port 112 along a forward propagation optical path of the first polarized beam.

It should be noted that in either the forward propagation direction or the backward propagation direction, in some embodiments, corresponding bands in the plurality of first optical sub-signals (for example, C-sub-band beams) and the plurality of second optical sub-signals (for example, L-sub-band beams) may be made to be propagated to a same position or close positions of the first-band filter 150 in the wavelength direction or the dispersion direction. As an example only, the C_1-sub-band beam and the L_1-sub-band beam may be forward or backward propagated to a same position or close positions of the first-band filter 150 in the wavelength direction or the dispersion direction, and the C_n-sub-band beam and the L_n-sub-band beam may be forward or backward propagated to a same position or close positions of the first-band filter 150 in the wavelength direction or the dispersion direction. In this way, sizes of the first-band filter 150 and the WSS module in the wavelength direction can be greatly reduced.

However, it will be understood that it is also possible that the plurality of corresponding first optical sub-signals (for example, C-sub-band beams) and the plurality of corresponding second optical sub-signals (for example, L-sub-band beams) are made to be propagated, in the forward or backward propagation direction, to different positions of the first-band filter 150 in the wavelength direction. In this case, for example, the first-band optical signal and the second-band optical signal may be input to the WSS by using one input port each.

The following describes an optical path condition of the wavelength selective switching apparatus in the port plane according to the second example embodiment of the present disclosure with reference to FIG. 10.

It can be seen from FIG. 10 that a multi-band beam (for example, a C+L-band beam) in the port plane may be input from the input port 110. A beam obtained through collimation by the collimator mirror 115 may be incident to the second polarization beam splitter 270 through the first polarization beam splitter 216, the ½ wave plate 217, the second lens 122, the fourth lens 124, the dispersion assembly 130, and the second lens assembly 140, then incident to the first wave plate 281, the first-band filter 150, the second wave plate 282, and finally incident to the light redirection device 160.

In some embodiments, an angle of incidence to the light redirection device 160 in the port plane may be 0 degree or near 0 degree (for example, within a range of ±10 degrees or ±5 degrees). In some other embodiments, the light redirection device may be at a rear focus position of the second lens assembly 140. In some other embodiments, a position of a rear focus of the first lens assembly 120 or the fourth lens 124 may coincide with that of a front focus of the second lens assembly 140. In some other embodiments, a position of a front focus of the fourth lens 124 may coincide with that of a rear focus of the second lens 122. In some other embodiments, a position of a front focus of the second lens 122 may coincide with that of a rear focus of the collimator mirror 115.

After the light redirection device switches the beam, the beam may be backward propagated to the output port 112. In some embodiments, the first lens assembly 120, particularly the second lens 122, may convert beams having different port direction switching angles into beams having different port direction displacements. The beams having different port direction displacements may be incident to different output ports through the collimator mirror.

It can be seen that in the port plane, after the first-band beam and the second-band beam are switched by the light redirection device, an angle (that is, a first backward incidence angle and a second backward incidence angle) which the first-band beam (for example, a C-band beam) and the second-band beam (for example, an L-band beam) are incident again (that is, incident in the backward propagation direction) to the first-band filter 150 may be equal to an angle at which the light redirection device 160 switches a signal or about the angle, for example, within a range of −3 degrees to +3 degrees. It will be understood that, compared with a case in which a large backward incidence angle is designed in the port plane, when a same signal switching angle of the light redirection device is applied, in this embodiment of the present disclosure, after the light redirection device switches the signal, change of an angle at which the beam is incident to the first-band filter in the port plane can be greatly reduced. According to the formula (2), this can greatly reduce the filter spectral shift of the first-band filter. Through experiments and calculation, the filter spectrum shift according to this embodiment of the present disclosure can be less than +/−1 nm. This greatly alleviates a filter impairment of a signal.

According to the foregoing descriptions of the first to third example embodiments, it will be understood that, in the improved technical solution of the present disclosure, although a multi-band filter is still used to perform band-division processing on a multi-band optical signal (for example, a C+L-band signal), However, light spots of two band beams (for example, a C-band beam and an L-band beam) may be distributed in two light redirection devices or two areas of one light redirection device with no additional special waveguides. This greatly improves a filtering bandwidth of, for example, a C+L-band WSS.

In addition, compared with a case in which a large backward incidence angle is designed in the port plane, when a same signal switching angle of the light redirection device is applied, in the first to third embodiments of the present disclosure, after the light redirection device switches a signal, an angle at which a beam is incident to a filter in the port plane can be greatly reduced. This can greatly reduce a filter spectrum shift of, for example, a multi-band filter (for example, a C/L filter), thereby greatly alleviating a filter impairment of a signal.

Figure 12:
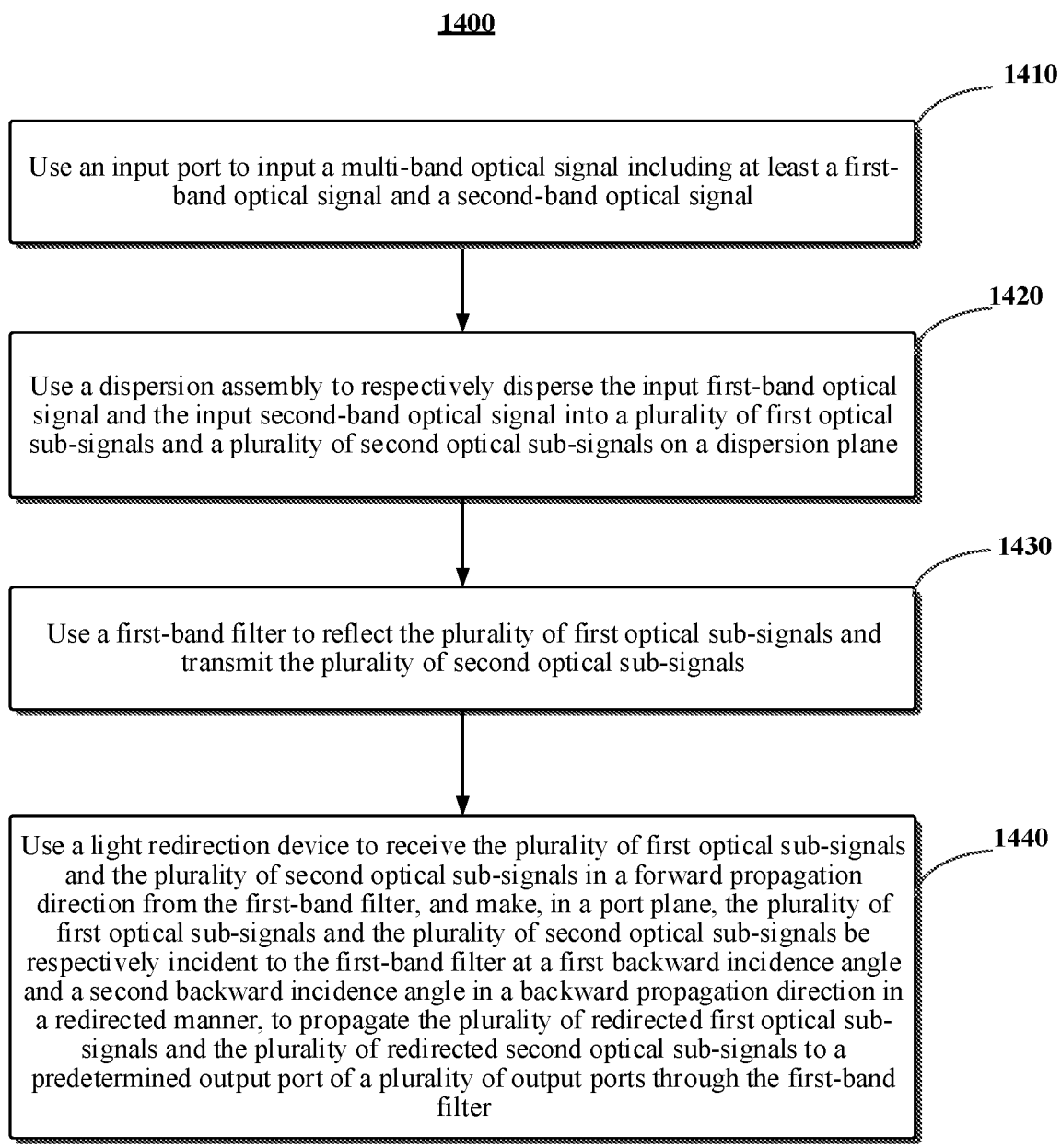
FIG. 12 is a schematic flowchart of a wavelength selective switching method according to an embodiment of the present disclosure.

FIG. 12 is a flowchart of a schematic flowchart of a wavelength selective switching method 1400 according to an example embodiment of the present disclosure.

As shown in FIG. 12, the method 1400 includes the following steps.

In a block 1410, an input port is used to input a multi-band optical signal including at least a first-band optical signal and a second-band optical signal. As an example only, the multi-band optical signal may be, for example, a C+L-band optical signal. A first band may be a C band, and a second band may be an L band. It will be understood that the multi-band optical signal may further include optical signals of more bands, or a multi-band optical signal different from the C+L-band optical signal.

In some embodiments, a multi-band optical signal may be input by using an optical fiber array. In some embodiments, a multi-band optical signal may be input by using a single input port. However, this is not a limitation, and it will be understood that in other embodiments, it is also possible to input a multi-band optical signal by using a plurality of different input ports. For example, the first input port may be used to input a first-band optical signal, and the second input port may be used to input a second-band optical signal.

In some embodiments, the input multi-band optical signal including the first-band optical signal and the second-band optical signal may be converted into a single-polarization signal. As an example only, a first polarization beam splitter may be used to split the input multi-band optical signal into an initial optical signal in a first polarization state and an initial optical signal in a second polarization state that are orthogonal to each other, where the initial optical signal in the first polarization state and the initial optical signal in the second polarization state have an angle or displacement difference in a dispersion direction. In a further embodiment, a ½ wave plate may be used to convert the initial optical signal in the first polarization state into a converted optical signal in a second polarization state.

In a block 1420, a dispersion assembly may be used to respectively disperse the input first-band optical signal and the input second-band optical signal into a plurality of first optical sub-signals and a plurality of second optical sub-signals in a dispersion plane, where the plurality of first optical sub-signals respectively correspond to a plurality of first sub-bands in a first band, the plurality of second optical sub-signals respectively correspond to a plurality of second sub-bands in a second band, and the dispersion plane is defined by a light propagation direction and the dispersion direction.

In some embodiments, after the multi-band optical signal including the first-band optical signal and the second-band optical signal is input from the input port, the input first-band optical signal and the input second-band optical signal may be incident to the dispersion assembly through, for example, the first lens assembly. The dispersion assembly may further perform dispersion splitting on the first-band optical signal and the second-band optical signal. A function of the first lens assembly is, on the one hand, to perform light spot shaping on an input optical signal, and on the other hand, to convert sub-band beams that are emitted from the light redirection device at different angles into beams having different displacements in the port direction.

It is easy to understand that the present disclosure does not limit the type of the dispersion assembly, as long as the dispersion assembly can implement dispersion splitting of sub-bands.

As an example only, in some embodiments, the dispersion assembly 130 may typically include only a grating device. The dispersion assembly 130 may directly disperse the first-band optical signal and the second-band optical signal that are incident to the dispersion assembly 130 into a plurality of first optical sub-signals and a plurality of second optical sub-signals in the dispersion plane, and then project the sub-band optical signal to the first-band filter downstream of the dispersion assembly. The dispersion direction may be a direction vertical to a grating groove. The optical propagation direction and dispersion direction may define the dispersion plane.

As a further example, as shown in FIG. 2, FIG. 5, and FIG. 9, the dispersion assembly 130 may include a combination of a first grating 131, a second-band filter 133, and a second grating 132. The second-band filter 133 is configured to reflect a first-band (for example, C-band) beam from the input port 110 to the first grating 131, and is configured to transmit a second-band (for example, L-band) beam from the input port 110 to the second grating 132. The first grating 131 and the second grating 132 are configured to: disperse incident light in the forward propagation direction into the plurality of first optical sub-signals and the plurality of second optical sub-signals at different angles, and emit the plurality of first optical sub-signals and the plurality of second optical sub-signals to the second-band filter 133.

As a further embodiment, the plurality of first optical sub-signals and the plurality of second optical sub-signals may be dispersed at roughly same positions on the second-band filter in the dispersion direction. This can help reduce sizes of the second-band filter and the WSS module in the dispersion direction.

In an embodiment using a multi-band polarized optical signal, the dispersion assembly may make the initial optical signal in the second polarization state and the converted optical signal in the second polarization state be respectively dispersed into an initial sub-band signal in a second polarization state and a converted sub-band signal in a second polarization state. Each of the initial sub-band signal in the second polarization state and the converted sub-band signal in the second polarization state includes a plurality of first optical sub-signals and a plurality of second optical sub-signals. In a further embodiment, an initial sub-band signal in the second polarization state and a converted sub-band signal in the second polarization state that have a same wavelength may be incident to the light redirection device at symmetrical angles in the dispersion plane.

In a further embodiment, a second optical sub-signal of the initial sub-band signal in the second polarization state and the converted sub-band signal in the second polarization state may be made to sequentially pass through the second polarization beam splitter, the first wave plate, the first-band filter, and the second wave plate, and be incident to the light redirection device. A sum of phase delays of both the first wave plate and the second wave plate is approximately nπ, and n is an odd number. In this manner, splitting of a second sub-band from the multi-band optical signal can be achieved. As an example only, both the first wave plate and the second wave plate may be ¼ wave plates.

In a further embodiment, a first optical sub-signal of the initial sub-band signal in the second polarization state and the converted sub-band signal in the second polarization state may be made to sequentially pass through the second polarization beam splitter and the first wave plate, be reflected by the first-band filter and pass through the first wave plate for a second time, and be reflected by the polarization splitting film to the light redirection device. A sum of phase delays generated when the first optical sub-signal passes through the first wave plate twice is approximately nπ, and n is an odd number. In this manner, splitting of a first sub-band from the multi-band optical signal can be achieved.

In some embodiments, the light redirection device is a single device, and the first optical sub-signal and the second optical sub-signal may be incident to different areas of the single device. This can reduce a quantity of devices.

In some other embodiments, the light redirection device may include a first light redirection device and a second light redirection device that are independent of each other. The first light redirection device is configured to receive and reflect a first optical sub-signal, and the second light redirection device is configured to receive and reflect a second optical sub-signal. In this manner, design of the WSS module can be made freer.

In a further embodiment, the block 1420 may further include: in the port plane, making the plurality of first optical sub-signals and the plurality of second optical sub-signals be respectively incident to the first-band filter 150 at a first forward incidence angle and a second forward incidence angle in the forward propagation direction, where both the first forward incidence angle and the second forward incidence angle fall within a second predetermined angle range. As an example, the second predetermined angle may be, for example, within a range of 0±10 degrees, 0±5 degrees, or 0±3 degrees, that is, vertical incidence or near vertical incidence is provided. This can help prevent a large-range filter spectrum shift, thereby avoiding a filter impairment. Particularly advantageously, the first forward incidence angle or the second forward incidence angle is within a range of 0±3 degrees.

In a further embodiment, the block 1420 may further include: in the dispersion plane, making a third forward incidence angle and a fourth forward incidence angle of the plurality of first optical sub-signals and the plurality of second optical sub-signals relative to the first-band filter 150 in the forward propagation direction be within a third predetermined angle range. In particular, the third predetermined angle range does not include 0 degree and 90 degrees. As an example, the third predetermined angle range is, for example, within a range of 45±10 degrees or 45±5 degrees. This can also help reduce a large-range filter spectrum shift, thereby avoiding a filter impairment.

In particular, in an embodiment in which polarization is used to split a multi-band optical signal, the block 1420 may further include: in the dispersion plane, making a third forward incidence angle and a fourth forward incidence angle of the plurality of first optical sub-signals and the plurality of second optical sub-signals relative to the first-band filter 150 in the forward propagation direction be within a fourth predetermined angle range. As an example, the fourth predetermined angle range is, for example, within a range of 0±10 degrees or 0±5 degrees. This can also help reduce a large-range filter spectrum shift, thereby avoiding a filter impairment.

As a further embodiment, the block 1420 may further include: in the port plane, reflecting the first optical sub-signal incident to the second polarization beam splitter for a second time in the forward propagation direction by using the second polarization beam splitter, to split the first optical sub-signal and the second optical sub-signal in the port plane. Alternatively, in the dispersion plane, the first optical sub-signal incident to the second polarization beam splitter for a second time in the forward propagation direction is reflected by using the second polarization beam splitter, to split the first optical sub-signal and the second optical sub-signal in the dispersion plane.

As a further embodiment, the block 1420 may further include: The first optical sub-signal and the second optical sub-signal of the initial optical sub-signal in the second polarization state and the converted optical sub-signal in the second polarization state may be incident to the polarization splitting film of the second polarization beam splitter at an incidence angle within a range of 45±10 degrees (or 45±5 degrees) for a first time in the port plane. Alternatively, the first optical sub-signal and the second optical sub-signal of the initial optical sub-signal in the second polarization state and the converted optical sub-signal in the second polarization state may be incident to the polarization splitting film of the second polarization beam splitter at an incidence angle within a range of 45±10 degrees (or 45±5 degrees) in the dispersion plane.

In a block 1430, a first-band filter is used to reflect the plurality of first optical sub-signals and transmit the plurality of second optical sub-signals.

In some embodiments, the plurality of sub-band optical signals dispersed by the dispersion assembly may be propagated to the first-band filter through the second lens assembly. The second lens assembly may convert the first optical sub-signal and the second optical sub-signal that are emitted from the dispersion assembly at different angles into beams having different displacements in the dispersion plane of the first-band filter. As an example, the second lens assembly may be, for example, a single spherical mirror having curvature in both the port plane and the dispersion plane.

Likewise, in some embodiments, the plurality of first optical sub-signals and the plurality of second optical sub-signals may be dispersed at roughly same positions on the first-band filter in the dispersion direction. This can help reduce sizes of the first-band filter and the WSS module in the dispersion direction.

In some embodiments, the block 1430 may further include: in the dispersion plane, making an incidence angle of the plurality of first optical sub-signals and the plurality of second optical sub-signals relative to the light redirection device 160 in the forward propagation direction be 0±10 degrees or 0±5 degrees. This can also help reduce a large-range filter spectrum shift, thereby avoiding a filter impairment.

In a block 1440, a light redirection device is used to receive the plurality of first optical sub-signals and the plurality of second optical sub-signals in a forward propagation direction from the first-band filter, and make, in a port plane, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, where the port plane is defined as a plane in which a predetermined arrangement direction of the plurality of output ports and the light propagation direction are located, the forward propagation direction is defined as an optical propagation direction from the input port to the light redirection device, and the backward propagation direction is defined as an optical propagation direction from the light redirection device to the output port; and the first backward incidence angle and the second backward incidence angle are within a first predetermined angle range. In particular, the first predetermined angle range may be within a range of 0±20 degrees, 0±10 degrees, 0±5 degrees, or 0±3 degrees.

This means that, in the backward propagation direction in the port plane, the optical signal may be incident to the first-band filter at a small angle. It will be understood that in this manner, a filter spectrum shift of, for example, a multi-band filter (for example, a C/L filter) can be greatly reduced, thereby greatly alleviating a filter impairment of a signal.

As an example, the light redirection device may include, but is not limited to, an LCOS spatial light modulator, an LC spatial light modulator, and a MEMS spatial light modulator.

In some embodiments, the block 1440 may further include: in the port plane, making the plurality of first optical sub-signals and the plurality of second optical sub-signals be respectively emitted from the light redirection device at a first emission angle and a second emission angle, where the first emission angle may be approximately equal to or equal to the first backward incidence angle, and the second emission angle is approximately equal to or equal to the second backward incidence angle. In this manner, this can help reduce a filter spectrum shift of, for example, a multi-band filter (for example, a C/L filter), thereby greatly alleviating a filter impairment of a signal.

The wavelength selective switching apparatus and the related method in the embodiments of the present disclosure have been described in detail above. It will be understood that the one or more wavelength selective switching apparatuses of the present disclosure may also be used as a part of other optical systems or optical apparatuses, or a combination thereof may constitute another optical system.

Figure 13:
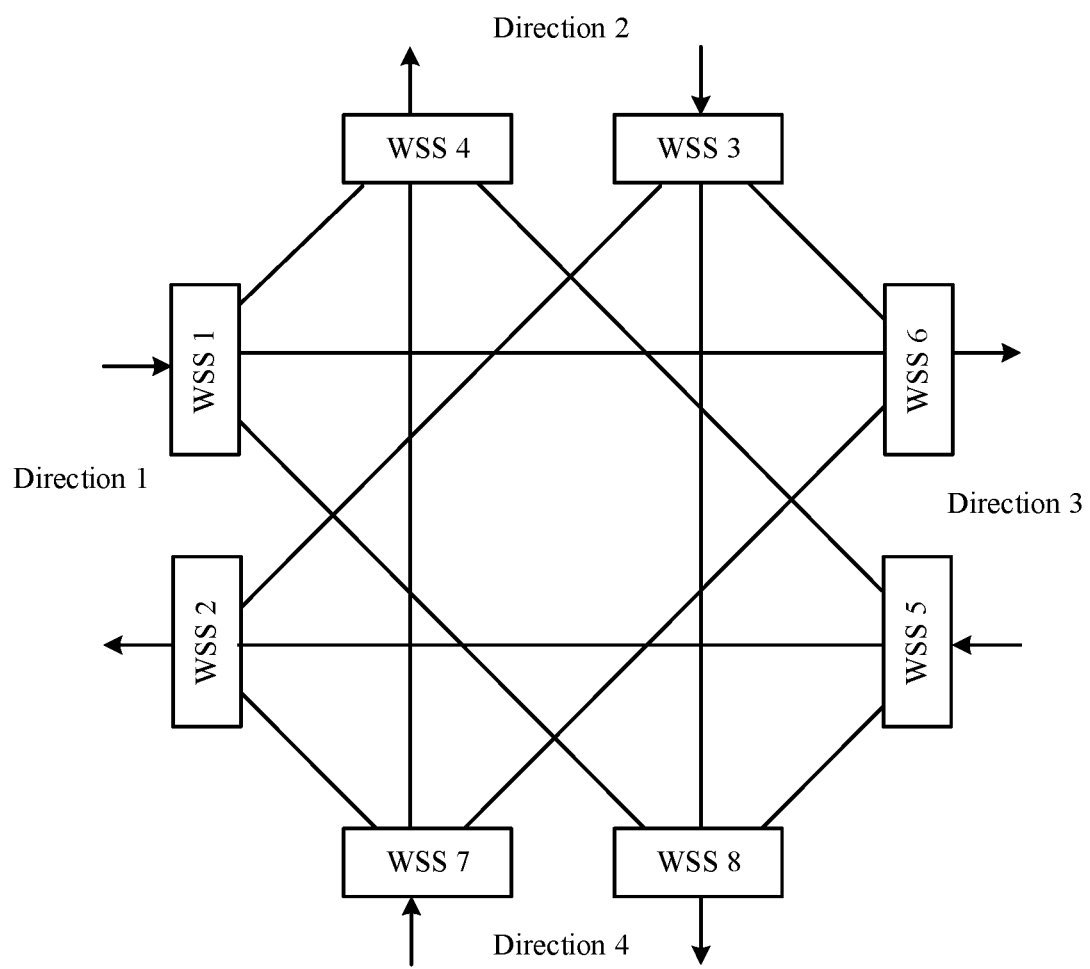
FIG. 13 shows a schematic architecture of a reconfigurable optical add drop module (ROADM) including a wavelength selective switching apparatus according to the present disclosure.

As an example only, FIG. 13 shows a schematic architecture of a reconfigurable optical add drop module (ROADM) including a wavelength selective switching apparatus WSS according to the present disclosure. As shown in FIG. 13, the ROADM architecture may include eight WSS modules (that is, a WSS 1 to a WSS 8). Each WSS module may be a WSS module according to an embodiment of the present disclosure. Specifically, one input WSS and one output WSS may be included in each direction. An output port of each input WSS is connected to an input port of an output WSS in another direction. In this way, an optical signal in any direction can be switched to any other direction. For example, through the ROADM, an optical signal may be input from an input port of the WSS 1 in a direction 1, then switched to an input port of an output WSS 4 in a direction 2 through an output port of the WSS 1, and finally propagated to the direction 2 through an output port of the WSS 4. In this way, an optical signal within an expected band range can be output in different directions, and a range of an output band can be expanded more freely.

Although the present invention has been illustrated and described in detail in the accompanying drawings and the foregoing descriptions, such illustrations and descriptions should be regarded to be illustrative or example rather than limiting. The present invention is not limited to the disclosed embodiments. Other variations of the disclosed embodiments will be understood and practiced by a person skilled in the art from a study of the accompanying drawings, the disclosure, and the appended claims in practicing the claimed invention. For example, although the above-described example embodiments limit that the output port and the input port are fixed, in some other embodiments, the output port and the input port may also be interchangeable. For example, one or more of the output ports may be transformed into an input port, and the input port may also be transformed to an output port. The foregoing transformation may be set according to a user's selection or actual application.

In addition, it should be understood that the methods, steps, or processes described above are merely examples. Although the specification describes the steps of the method in a particular order, this does not require or imply that the operations must be performed in that particular order, or that all of the shown operations need to be performed to achieve a desired result, rather, the described steps may change the order of execution. Additionally or alternatively, some steps may be omitted, a plurality of steps may be combined into one step for execution, and/or one step may be broken down into a plurality of steps for execution.

In the claims, the word "comprise" does not exclude other elements, and the indefinite article "a" or "an" does not exclude a plurality. Single element or other units may fulfill the functions of a plurality of items set forth in the claims. The mere fact that some features are only described in mutually different embodiments or dependent claims does not mean that a combination of these features cannot be advantageously used. Without departing from the spirit and scope of this application, the protection scope of this application covers any possible combination of features disclosed in various embodiments or dependent claims.

Further, any reference numeral in the claims should not be construed as limiting the scope of the invention.

What is claimed is:

1. A wavelength selective switching apparatus, comprising:
   at least one input port and a plurality of output ports, wherein the at least one input port is configured to receive a first-band optical signal and a second-band optical signal, each of the plurality of output ports is configured to output an optical signal within a predetermined band range;
   a dispersion assembly, configured to respectively disperse the first-band optical signal and the second-band optical signal that are received from the at least one input port into a plurality of first optical sub-signals and a plurality of second optical sub-signals in a dispersion plane, wherein the plurality of first optical sub-signals respectively correspond to a plurality of first sub-bands in a first band, the plurality of second optical sub-signals respectively correspond to a plurality of second sub-bands in a second band, and the dispersion plane is a plane in which a light propagation direction and a dispersion direction are located;
   a first-band filter, configured to reflect the plurality of first optical sub-signals and transmit the plurality of second optical sub-signals; and
   a light redirection device, configured to: receive the plurality of first optical sub-signals and the plurality of second optical sub-signals in a forward propagation direction from the first-band filter, and make, in a port plane in which a predetermined arrangement direction of the plurality of output ports and the light propagation direction are located, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, wherein the forward propagation direction is an optical propagation direction from the input port to the light redirection device, and the backward propagation direction is an optical propagation direction from the light redirection device to the output port; and
   wherein both the first backward incidence angle and the second backward incidence angle are within a first predetermined angle range.

2. The wavelength selective switching apparatus according to claim 1, wherein the first predetermined angle range is a range of 0±20 degrees.

3. The wavelength selective switching apparatus according to claim 1, wherein in the port plane, the plurality of first optical sub-signals and the plurality of second optical sub-signals are respectively incident to the first-band filter at a first forward incidence angle and a second forward incidence angle in the forward propagation direction, and both the first forward incidence angle and the second forward incidence angle fall within a second predetermined angle range.

4. The wavelength selective switching apparatus according to claim 3, wherein the second predetermined angle range is a range of 0±10 degrees.

5. The wavelength selective switching apparatus according to claim 1, wherein in the port plane, the plurality of first optical sub-signals and the plurality of second optical sub-signals are respectively emitted from the light redirection device at a first emission angle and a second emission angle, the first emission angle is approximately equal to or equal to the first backward incidence angle, and the second emission angle is approximately equal to or equal to the second backward incidence angle.

6. The wavelength selective switching apparatus according to claim 1, further comprising a first lens assembly, disposed between the light redirection device and the output port on an optical path, wherein the first lens assembly is configured to convert optical sub-signals that are emitted from the light redirection device in a redirected manner at different angles into optical sub-signals having different positions in a port direction, so that the optical sub-signals at different positions are output from different output ports, and the port direction is the predetermined arrangement direction of the plurality of output ports.

7. The wavelength selective switching apparatus according to claim 1, further comprising a second lens assembly, disposed between the dispersion assembly and the light redirection device on an optical path, wherein the second lens assembly is configured to convert the first optical sub-signal and the second optical sub-signal that are emitted from the dispersion assembly at different angles into optical signals having different positions in a dispersion plane of the light redirection device.

8. The wavelength selective switching apparatus according to claim 1, wherein the dispersion assembly comprises a first grating, a second-band filter, and a second grating, wherein the second-band filter is configured to reflect the first-band optical signal from the input port to the first grating and is configured to transmit the second-band optical signal from the input port to the second grating; wherein
   the first grating and the second grating are configured to: respectively disperse the first-band optical signal and the second-band optical signal in the forward propagation direction into the plurality of first optical sub-signals and the plurality of second optical sub-signals at different angles, and emit the plurality of first optical sub-signals and the plurality of second optical sub-signals to the second-band filter; and
   the second-band filter is configured to: reflect the plurality of first optical sub-signals to the first-band filter, and transmit the plurality of second optical sub-signals to the first-band filter.

9. The wavelength selective switching apparatus according to claim 1, wherein the plurality of first optical sub-signals and the plurality of second optical sub-signals are dispersed in a same position in the first-band filter in the dispersion direction.

10. The wavelength selective switching apparatus according to claim 1, wherein in the dispersion plane, the plurality of first optical sub-signals and the plurality of second optical sub-signals are respectively incident to the first-band filter at a third forward incidence angle and a fourth forward incidence angle in the forward propagation direction, both the third forward incidence angle and the fourth forward incidence angle fall within a third predetermined angle range, and the third predetermined angle range does not comprise 0 degree and 90 degrees.

11. A reconfigurable optical add drop module (ROADM), comprising one or more wavelength selective switching apparatuses, wherein each of the one or more wavelength selective switching apparatuses comprises:
at least one input port and a plurality of output ports, wherein the at least one input port is configured to receive a first-band optical signal and a second-band optical signal, each of the plurality of output ports is configured to output an optical signal within a predetermined band range;
a dispersion assembly, configured to respectively disperse the first-band optical signal and the second-band optical signal that are received from the at least one input port into a plurality of first optical sub-signals and a plurality of second optical sub-signals in a dispersion plane, wherein the plurality of first optical sub-signals respectively correspond to a plurality of first sub-bands in a first band, the plurality of second optical sub-signals respectively correspond to a plurality of second sub-bands in a second band, and the dispersion plane is a plane in which a light propagation direction and a dispersion direction are located;
a first-band filter, configured to reflect the plurality of first optical sub-signals and transmit the plurality of second optical sub-signals; and
a light redirection device, configured to: receive the plurality of first optical sub-signals and the plurality of second optical sub-signals in a forward propagation direction from the first-band filter, and make, in a port plane in which a predetermined arrangement direction of the plurality of output ports and the light propagation direction are located, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, wherein the forward propagation direction is an optical propagation direction from the input port to the light redirection device, and the backward propagation direction is an optical propagation direction from the light redirection device to the output port; and
wherein both the first backward incidence angle and the second backward incidence angle are within a first predetermined angle range.

12. A wavelength selective switching method, comprising:
using at least one input port to input a first-band optical signal and a second-band optical signal;
using a dispersion assembly to respectively disperse the input first-band optical signal and the input second-band optical signal into a plurality of first optical sub-signals and a plurality of second optical sub-signals in a dispersion plane, wherein the plurality of first optical sub-signals respectively correspond to a plurality of first sub-bands in a first band, the plurality of second optical sub-signals respectively correspond to a plurality of second sub-bands in a second band, and the dispersion plane is a plane in which a light propagation direction and a dispersion direction are located;
using a first-band filter to reflect the plurality of first optical sub-signals and transmit the plurality of second optical sub-signals; and
using a light redirection device to receive the plurality of first optical sub-signals and the plurality of second optical sub-signals in a forward propagation direction from the first-band filter, and make, in a port plane, the plurality of first optical sub-signals and the plurality of second optical sub-signals be respectively incident to the first-band filter at a first backward incidence angle and a second backward incidence angle in a backward propagation direction in a redirected manner, to propagate the plurality of redirected first optical sub-signals and the plurality of redirected second optical sub-signals to a predetermined output port in the plurality of output ports through the first-band filter, wherein the port plane is a plane in which a predetermined arrangement direction of the plurality of output ports and the light propagation direction are located, the forward propagation direction is an optical propagation direction from the input port to the light redirection device, and the backward propagation direction is an optical propagation direction from the light redirection device to the output port; and
both the first backward incidence angle and the second backward incidence angle are within a first predetermined angle range.

13. The wavelength selective switching method according to claim 12, wherein the first predetermined angle range is a range of 0±20 degrees.

14. The wavelength selective switching method according to claim 12, wherein in the port plane, a first forward incidence angle and a second forward incidence angle at which the plurality of first optical sub-signals and the plurality of second optical sub-signals are respectively incident in the forward propagation direction fall within a second predetermined angle range, and the forward propagation direction is an optical propagation direction from the input port to the light redirection device.

15. The wavelength selective switching method according to claim 14, wherein the second predetermined angle range is a range of 0±10 degrees.

16. The wavelength selective switching method according to claim 12, wherein in the port plane, the plurality of first optical sub-signals and the plurality of second optical sub-signals are respectively emitted from the light redirection device at a first emission angle and a second emission angle, the first emission angle is approximately equal to or equal to the first backward incidence angle, and the second emission angle is approximately equal to or equal to the second backward incidence angle.

17. The wavelength selective switching method according to claim 12, wherein the plurality of first optical sub-signals and the plurality of second optical sub-signals are dispersed in a same position in the first-band filter in the dispersion direction.

18. The wavelength selective switching method according to claim 12, wherein in the dispersion plane, forward incidence angles of the plurality of first optical sub-signals and the plurality of second optical sub-signals relative to the first-band filter in the forward propagation direction both fall within a third predetermined angle range, and the third predetermined angle range does not comprise 0 degree and 90 degrees.

19. The wavelength selective switching method according to claim 18, wherein the third predetermined angle range is a range of 45±10 degrees.

20. The wavelength selective switching method according to claim 12, further comprising:
  using a first polarization beam splitter to split the input first-band optical signal and the input second-band optical signal into an initial optical signal in a first polarization state and an initial optical signal in a second polarization state that are orthogonal to each other, wherein the initial optical signal in the first polarization state and the initial optical signal in the second polarization state have an angle or displacement difference in the dispersion direction; and
  using a ½ wave plate to convert the initial optical signal in the first polarization state into a converted optical signal in a second polarization state.

* * * * *